United States Patent
Surdeanu et al.

(10) Patent No.: US 12,019,981 B2
(45) Date of Patent: Jun. 25, 2024

(54) METHOD AND SYSTEM FOR CONVERTING LITERATURE INTO A DIRECTED GRAPH

(71) Applicant: ARIZONA BOARD OF REGENTS ON BEHALF OF THE UNIVERSITY OF ARIZONA, Tucson, AZ (US)

(72) Inventors: Mihai Surdeanu, Tucson, AZ (US); Marco A. Valenzuela Escarcega, Tucson, AZ (US); Gustave Hahn-Powell, Tucson, AZ (US); Dane Bell, Tucson, AZ (US); Thomas Hicks, Tucson, AZ (US); Enrique Noriega, Tucson, AZ (US); Clayton Morrison, Tucson, AZ (US); Rebecca Sharp, Tucson, AZ (US); Robert Ionut Vacareanu, Botosani (RO); George Barbosa, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 364 days.

(21) Appl. No.: 17/344,774

(22) Filed: Jun. 10, 2021

(65) Prior Publication Data

US 2021/0357585 A1   Nov. 18, 2021

Related U.S. Application Data

(63) Continuation-in-part of application No. 15/920,170, filed on Mar. 13, 2018, now abandoned.
(Continued)

(51) Int. Cl.
*G06F 40/211* (2020.01)
*G06F 3/0482* (2013.01)
(Continued)

(52) U.S. Cl.
CPC .......... *G06F 40/211* (2020.01); *G06F 3/0482* (2013.01); *G06F 16/245* (2019.01);
(Continued)

(58) Field of Classification Search
CPC ...... G06F 40/20; G06F 40/237; G06F 40/279; G06F 40/289; G06F 40/295; G06F 40/30; G06F 40/211
(Continued)

(56) References Cited

U.S. PATENT DOCUMENTS

| 5,708,825 A | 1/1998 | Sotomayor |
| 7,398,201 B2 | 7/2008 | Marchisio |

(Continued)

OTHER PUBLICATIONS

Bell et al. An Investigation of Coreference Phenomena in the Biomedical Domain. (2016) In Proceedings of the 10th International Conference on Language Resources and Evaluation, LREC 2016. p. 177-183.
(Continued)

*Primary Examiner* — Martin Lerner
(74) *Attorney, Agent, or Firm* — NGUYEN TARBET LLC

(57) ABSTRACT

A machine reading system is described herein that includes a framework in which grammar rules can be developed using a concise language that combines syntax and semantics. The resulting technology thus reduces the development time for new grammars in a new domain. An enormous amount of information appears in the form of natural language across millions of academic papers and other literature sources. For example, in the biological domain, there is a tremendous ongoing effort to extract individual chemical interactions from these texts, but these interactions are only isolated fragments of larger causal mechanisms such as protein signaling pathways. The proposed rule-based event extraction framework can model underlying syntactic rep-
(Continued)

resentations of events in order to extract signaling pathway fragments. Though application to the biomedical domain is herein described, the framework is domain-independent and is expressive enough to capture most complex events annotated by domain experts.

19 Claims, 14 Drawing Sheets

Related U.S. Application Data

(60) Provisional application No. 62/470,779, filed on Mar. 13, 2017.

(51) Int. Cl.
G06F 16/245 (2019.01)
G06F 40/169 (2020.01)
G06F 40/253 (2020.01)
G06F 40/284 (2020.01)
G06F 40/295 (2020.01)
G06F 40/30 (2020.01)

(52) U.S. Cl.
CPC .......... G06F 40/169 (2020.01); G06F 40/253 (2020.01); G06F 40/284 (2020.01); G06F 40/295 (2020.01); G06F 40/30 (2020.01)

(58) Field of Classification Search
USPC .................................................. 704/1, 9, 10
See application file for complete search history.

(56) References Cited

U.S. PATENT DOCUMENTS

| | | | |
|---|---|---|---|
| 8,340,957 B2 | 12/2012 | Gallagher et al. | |
| 8,429,179 B1* | 4/2013 | Mirhaji ............... | G06F 40/211 707/756 |
| 9,836,183 B1 | 12/2017 | Love et al. | |
| 10,621,390 B1* | 4/2020 | Winston ............... | G06F 40/211 |
| 2003/0105638 A1* | 6/2003 | Taira .................. | G06F 40/56 704/275 |
| 2003/0237096 A1 | 12/2003 | Barrett et al. | |
| 2005/0278325 A1 | 12/2005 | Mihalcea et al. | |
| 2007/0283252 A1 | 12/2007 | Stuhec | |
| 2013/0138597 A1* | 5/2013 | Kyle .................. | G06F 40/154 706/48 |
| 2013/0238321 A1 | 9/2013 | Tamura et al. | |
| 2014/0019118 A1* | 1/2014 | Tromp ................ | G06F 40/253 704/9 |
| 2014/0250047 A1* | 9/2014 | Bounouane ........... | G06F 40/279 706/52 |
| 2015/0278195 A1* | 10/2015 | Yang .................. | G06F 40/30 704/9 |
| 2015/0347375 A1* | 12/2015 | Tremblay ............ | G06F 40/211 704/9 |
| 2016/0321244 A1 | 11/2016 | Hashimoto et al. | |
| 2018/0129754 A1 | 5/2018 | Jones et al. | |
| 2018/0232443 A1* | 8/2018 | Delgo ................. | G06F 40/295 |
| 2018/0260474 A1* | 9/2018 | Surdeanu ............ | G06F 40/279 |
| 2018/0329880 A1* | 11/2018 | Galitsky ............. | G06F 40/35 |

OTHER PUBLICATIONS

Hahn-Powell et al. This before That: Causal Precedence in the Biomedical Domain. (Submitted on Jun. 26, 2016) arXiv:1606.08089 [cs.CL].
Hahn-Powell et al. Swanson linking revisited: Accelerating literature-based discovery across domains using a conceptual influence graph. Proceedings of the 55th Annual Meeting of the Association for Computational Linguistics—System Demonstrations, pp. 103-108.

Vancouver, Canada, Jul. 30-Aug. 4, 2017. c 2017 Association for Computational Linguistics https://doi.org/10.18653/v1/P17-4018.
Valenzuela-Escarcega et al. A Domain-independent Rule-based Framework for Event Extraction. In: Proceedings of the 53rd Annual Meeting of the Association for Computational Linguistics and the 7th International Joint Conference on Natural Language Processing of the Asian Federation of Natural Language Processing: Software Demonstrations (ACL-IJCNLP); 2015. p. 127-132.
Valenzuela-Escarcega et al. Odin's Runes: A Rule Language for Information Extraction. Proceedings of the 10th International Conference on Language Resources and Evaluation, LREC 2016. pp. 322-329. Jan. 1, 2016.
Valenzuela-Escarcega et al. Large-scale Automated Reading with Reach Discovers New Cancer Driving Mechanisms. 2017, In Proceedings of the Sixth BioCreative Challenge Evaluation Workshop, pp. 201-203.
Ailsa H. Land and Alison G. Doig. 1960. An automatic method of solving discrete programming problems. Econometrica, 28(3):497-520.
Mina Lee, Sunbeom So, and Hakjoo Oh. 2016. Synthesizing regular expressions from examples for introductory automata assignments. In Proceedings of the 2016 ACM SIGPLAN International Conference on Generative Programming: Concepts and Experiences, pp. 70-80.
Jacob Devlin, Ming-Wei Chang, Kenton Lee, and Kristina Toutanova. 2018. BERT: pre-training of deep bidirectional transformers for language understanding. CoRR, abs/1810.04805.
Iulia Turc, Ming-Wei Chang, Kenton Lee, and Kristina Toutanova. 2019. Well-read students learn better: The impact of student initialization on knowledge distillation. CoRR, abs/1908.08962.
Lushan Han, Abhay L. Kashyap, Tim Finin, James Mayfield, and Jonathan Weese. 2013. UMBC_EBIQUITY-CORE: Semantic textual similarity systems. In Second Joint Conference on Lexical and Computational Semantics (*SEM), vol. 1: Proceedings of the Main Conference and the Shared Task: Semantic Textual Similarity, pp. 44-52, Atlanta, Georgia, USA. Association for Computational Linguistics.
Leslie N. Smith. 2017. Cyclical learning rates for training neural networks. In 2017 IEEE Winter Conference on Applications of Computer Vision (WACV), pp. 464-472.
Yoshua Bengio, Jérôme Louradour, Ronan Colobert, and Jason Weston. 2009. Curriculum learning. In Proceedings of the 26th Annual International Conference on Machine Learning, ICML '09, p. 41-48, New York, NY, USA. Association for Computing Machinery.
Emmanouil Antonios Platanios, Otilia Stretcu, Graham Neubig, Barnabás Póczos, and Tom M. Mitchell. 2019. Competence-based curriculum learning for neural machine translation. CoRR, abs/1903.09848.
Yuhao Zhang, Victor Zhong, Danqi Chen, Gabor Angeli, and Christopher D. Manning. 2017. Position-aware attention and supervised data improve slot filling. In Proceedings of the 2017 Conference on Empirical Methods in Natural Language Processing (EMNLP 2017), pp. 35-45.
Jeffrey Pennington, Richard Socher, and Christopher Manning. 2014. GloVe: Global vectors for word representation. In Proceedings of the 2014 Conference on Empirical Methods in Natural Language Processing (EMNLP), pp. 1532-1543, Doha, Qatar. Association for Computational Linguistics.
Pauli Virtanen, Ralf Gommers, Travis E. Oliphant, Matt Haberland, Tyler Reddy, David Cournapeau, Evgeni Burovski, Pearu Peterson, Warren Weckesser, Jonathan Bright, Stéfan J. van der Walt, Matthew Brett, Joshua Wilson, K. Jarrod Millman, Nikolay Mayorov, Andrew R. J. Neson, Eric Jones, Robert Kern, Eric Larson, C J Carey, Ilhan Polat, Yu Feng, Eric W. Moore, Jake VanderPlas, Denis Laxalde, Josef Perktold, Robert Cimrman, Ian Henriksen, E. A. Quintero, Charles R. Harris, Anne M. Archibald, Antonio H. Ribeiro, Fabian Pedregosa, Paul van Mulbregt, and SciPy 1.0.
F. Pedregosa, G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot, and E. Duchesnay. 2011. Scikit-learn: Machine learning in Python. Journal of Machine Learning Research, 12:2825-2830.

(56) References Cited

OTHER PUBLICATIONS

Ilya Sutskever, Oriol Vinyals, and Quoc V. Le. 2014. Sequence to sequence learning with neural networks. In Proceedings of the 27th International Conference on Neural Information Processing Systems—vol. 2, NIPS'14, p. 3104-3112, Cambridge, MA, USA. MIT Press.

Ashish Vaswani, Noam Shazeer, Niki Parmar, Jakob Uszkoreit, Llion Jones, Aidan N. Gomez, undefinedukasz Kaiser, and Illia Polosukhin. 2017. Attention is all you need. In Proceedings of the 31st International Conference on Neural Information Processing Systems, NIPS'17, p. 6000-6010, Red Hook, NY, USA. Curran Associates Inc.

Chenglong Wang, Kedar Tatwawadi, Marc Brockschmidt, Po-Sen Huang, Yi Mao, Oleksandr Polozov, and Rishabh Singh. 2018a. Robust text-to-sql generation with execution-guided decoding. arXiv preprint arXiv:1807.03100.

Mandar Joshi, Danqi Chen, Yinhan Liu, Daniel S. Weld, Luke Zettlemoyer, and Omer Levy. 2020. SpanBERT: Improving pre-training by representing and predicting spans. Transactions of the Association for Computational Linguistics, 8:64-77.

Wenxuan Zhou and Muhao Chen. 2021. An improved baseline for sentence-level relation extraction. arXiv preprint arXiv:2102.01373.

Amir DN Cohen, Shachar Rosenman, and Yoav Goldberg. 2020. Relation classification as two-way span-prediction. arXiv preprint arXiv:2010.04829.

Keita Kurita, Nidhi Vyas, Ayush Pareek, Alan W Black, and Yulia Tsvetkov. 2019. Measuring bias in contextualized word representations. arXiv preprint arXiv:1906.07337.

Emily Sheng, Kai-Wei Chang, Prem Natarajan, and Nanyun Peng. 2019. The woman worked as a babysitter: On biases in language generation. In Proceedings of the 2019 Conference on Empirical Methods in Natural Language Processing and the 9th International Joint Conference on Natural Language Processing (EMNLP-IJCNLP), pp. 3398-3403.

\* cited by examiner

Entity and Event Visualization                                    Hide

1  [Protein]—Controller—+Reg—Controlled—[Phosphorylation]—Th—[Gene_GP]
   TopBP1      promotes   the   phosphorylation of cyclin-D1 by ATR.

Syntax Visualization                                              Hide

┌──dobj──┐  ┌───prep_by───┐
                     └─prep_of─┐
   [NN]—nsubj—VBZ  [DT]—det—[NN]  [IN]  [NN]  [IN]  [NN]
1  TopBP1 promotes the phosphorylation of cyclin-D1 by ATR.

FIG. 3A

┌──prep_of──┐
         ┌──dobj──┐   ┌──prep_of──┐              ┌conj_and┐
   [NN]—nsubj—VBZ  [DT]—det—[NN]  [IN] [CC]—preconj—[NN] [CC] [NN]
   CYLD   inhibits the ubiquitination of both      TRAF2 and TRAF6

FIG. 3B

```
 1  taxonomy:
 2    - Entity:
 3      - Protein
 4      - SimpleChemical
 5    - Event:
 6      - SimpleEvent:
 7        - Phosphorylation
 8        - Ubiquitination
 9      - NestedEvent:
10        - PositiveRegulation
11        - NegativeRegulation
12
13  rules:
14    - name: ner
15      label: Protein
16      type: token
17      pattern: |
18        [entity="B-Protein"][entity="I-Protein"]*
19
20    - name: ubiq
21      label: Ubiquitination
22      pattern: |
23        trigger = ubiquitination
24        theme:Protein = prep_of
25        cause:Protein? = prep_by
26
27    - name: negreg
28      label: NegativeRegulation
29      pattern: |
30        trigger = [lemma=inhibit & tag=/^V/]
31        theme:Event = dobj
32        cause:Protein = nsubj
```

FIG. 6

METHOD AND SYSTEM FOR CONVERTING LITERATURE INTO A DIRECTED GRAPH

CROSS REFERENCE

This application is a Continuation-In-Part and claims priority to U.S. patent application Ser. No. 15/920,170, filed Mar. 13, 2018, which claims priority to U.S. Provisional Patent Application No. 62/470,779, filed Mar. 13, 2017, the specification(s) of which is/are incorporated herein in their entirety by reference.

GOVERNMENT SUPPORT

This invention was made with government support under Grant No. W911NF-14-1-0395, awarded by ARMY/ARO. The government has certain rights in the invention.

FIELD OF THE INVENTION

The present invention relates to information extraction methods, more specifically, an information extraction method for extracting and encoding relevant information from source documents to provide a searchable database.

BACKGROUND OF THE INVENTION

In the biomedical domain, an enormous amount of information about protein, gene, and drug interactions appears in the form of natural language across millions of academic papers. For instance, there is a tremendous ongoing effort to extract individual chemical interactions from these texts, but these interactions are only isolated fragments of larger causal mechanisms such as protein signaling pathways. Unfortunately, most of the mechanistic knowledge in the literature is not in a computable form and mostly remains hidden. Existing biocuration efforts are extremely valuable for solving this problem, but, unfortunately, they are outscaled by the explosive growth of the literature. This gap severely limits the value of big data in biology.

Rule-based information extraction ("IE") has long enjoyed wide adoption throughout industry, though it has remained largely ignored in academia in favor of machine learning ("ML") methods. Rule-based methods have several advantages over pure ML methods, including: (a) the rules are interpretable and thus suitable for rapid development and domain transfer (i.e., adaptable to other disciplines each requiring a particular lexicon of terms) and (b) both humans and machines can contribute to the same method. However, currentiy existing rule-based systems and methods fail to hold the attention of the academic community, which may be due to the lack of a standardized language or way to express rules, which raises the entry cost for new rule-based systems. The present invention aims to address this issue with a novel event extraction ("EE") language and framework called Open Domain INformer ("ODIN").

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In some aspects, the present invention features a method for converting literature of a given field of study into a directed graph. The method may comprise constructing a plurality of rules, pre-processing the literature to produce an annotated document, extracting a plurality of simple events from the annotated document using the plurality of rules, iteratively repeating the extraction of the plurality of simple events to extract the nested events from the annotated document until no more events are identified, distinguishing, via annotation, a polarity for each event identified in the literature, and distinguishing, via annotation, each event identified by the literature as speculative from each factual event. From this method, the directed graph is thus produced as each term and each function in the literature is annotated.

In other aspects, the present invention features a system for providing a searchable, structured data set by converting literature of a given field of study into a directed graph. The system may comprise a web-based user interface, a remote server operatively coupled to the web-based user interface, comprising a database storing a pre-defined domain grammar, and a processor operatively coupled to the database, and configured to execute an algorithm of the pre-defined domain grammar to perform operations. In some embodiments, the operations performed by the processor may comprise pre-processing the literature to produce an annotated document, extracting a plurality of simple events from the annotated document using the plurality of rules, iteratively repeating the step of extracting the plurality of simple events to extract the nested events from the annotated document until no more events are identified, distinguishing, via annotation, a polarity for each event identified in the literature, and distinguishing, via annotation, each event identified by the literature as speculative from each factual event. The directed graph can be produced as each term and each function in the literature is annotated. A visualization of the directed graph may be generated, which can be optionally displayed to the user via the web-based user interface.

In some aspects, the present invention provides a novel event extraction language and framework, ODIN, that is able to capture both simple and complex language constructs by taking advantage of syntactic dependencies within a sentence. The framework employs the following inventive features, which are executed after preprocessing a source document:

1. Grounding: each mention of a key term is linked to a corresponding entry in one or more external databases. A unique identifier is generated and assigned to each mention having no corresponding entry.

2. Extraction of Simple Events: annotating a plurality of mentions of a plurality of simple events in the source document using a set of trigger phrases, each characteristic of an individual simple event, to locate the plurality of mentions.

3. Extraction of Nested Events: annotating a plurality of mentions of a plurality of nested events in the source document using a second set of trigger phrases, each characteristic of an individual nested event, to locate the plurality of mentions.

4. Negation: annotating a negation of an event (simple or nested) as the negation of said event instead of as a unique event.

5. Hedging: distinguishing, via annotation, each event (simple or nested) identified by the source document as speculative from factual events. Determination of speculation is based on locating a set of words describing the event and determining whether the set of words contain speculative language.

6. Polarity: assigning a utility to a nested event comprising participants with opposing polarities, wherein a polarity is an expression of degree modifying a term or a function.

Without wishing to limit the present invention to a particular theory or mechanism, the approach of the ODIN framework is takes advantage of a syntactic dependency ("SD") representation that captures single or multi-word event predicates (with lexical and morphological constraints) and event arguments (e.g., theme) with (generally) simple syntactic patterns and semantic constraints. The ODIN framework is also powerful; capable of capturing complex constructs when necessary, such as: (a) recursive events and (b) complex regular expressions over syntactic patterns for event arguments. A standard regular expression language was extended to describe patterns over directed graphs. Also allowed for were optional arguments and multiple arguments with the same name. Furthermore, the ODIN framework is robust. To recover from unavoidable syntactic errors, SD patterns were freely mixed with surface, token-based patterns using a language inspired by the Allen Institute of Artificial Intelligence's Tagger and Stanford's semgrex language. These patterns match against information extracted in the text processing pipeline, namely, a token's part of speech, lemmatized form, named entity label, and the immediate incoming and outgoing edges in the SD graph. Lastly, the EE runtime is fast because the rules use event phrases ("triggers") captured with shallow lexicomorphological patterns as starting points. Only when triggers are detected is the matching of more complex syntactic patterns for arguments attempted. This guarantees quick executions. For example, in the biochemical domain, the present invention processes an average of 110 sentences/second with a grammar of 211 rules on a laptop with an i7 CPU and 16 GB of random access memory.

In other aspects, the present invention includes a machine reading and assembly (MRA), called REACH (from REading and Assembling Contextual and Holistic mechanisms from text), which produces a graph of influence relations from a collection of publications. This system extracts entities (e.g., proteins, other chemicals, biological processes) and events (e.g., biochemical interactions) from literature. REACH is built on top of the ODIN IE framework and can capture several kinds of events, including nested events (i.e., events involving other events). The event grammars are applied in cascades composed of rules that describe patterns over both syntactic dependencies and token sequences, using constraints over a token's attributes (part-of-speech tag, lemma, etc.). Furthermore, REACH captures complex natural language phenomena such as coreference, and event polarity in statements containing double or triple negations.

BRIEF DESCRIPTION OF THE DRAWINGS

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 3A shows a Brat-based visualization of the event mentions created from a sample sentence: "TopBP1 promotes the phosphorylation of cyclin-D1 by ATR." This event is an example of a nested event.

FIG. 3B shows a non-limiting sample sentence in the biomedical domain. Around the text are shown the outputs of several pre-processing steps. Directly above the text are shown part-of-speech tags. For example, NN indicates a noun, VBZ indicates verb in present tense). The individual words are connected through syntactic dependencies (e.g., nsubj indicates that the word "CYLD" is the nominal subject of the verb "inhibits"). Below the text are shown the output of an entity recognizer, which indicates that 3 entities have been identified as proteins (B-PROTEIN indicates that the corresponding word begins a protein name).

FIG. 6 shows a non-limiting embodiment of grammar that captures the relevant entities and events in the example sentence in FIG. 3B. The first rule uses a surface pattern, while the other two use syntactic patterns.

FIG. 8A shows the user searches for indirect influence connections between "breastfeeding" and "malnutrition". FIG. 8B shows these results are imported in the model construction workspace. FIG. 8C shows the user searches for indirect influence connections between "campylobacter" and "malnutrition". FIG. 8D shows the user imports these new results in the model construction workspace.

DEFINITIONS

Figure 1:
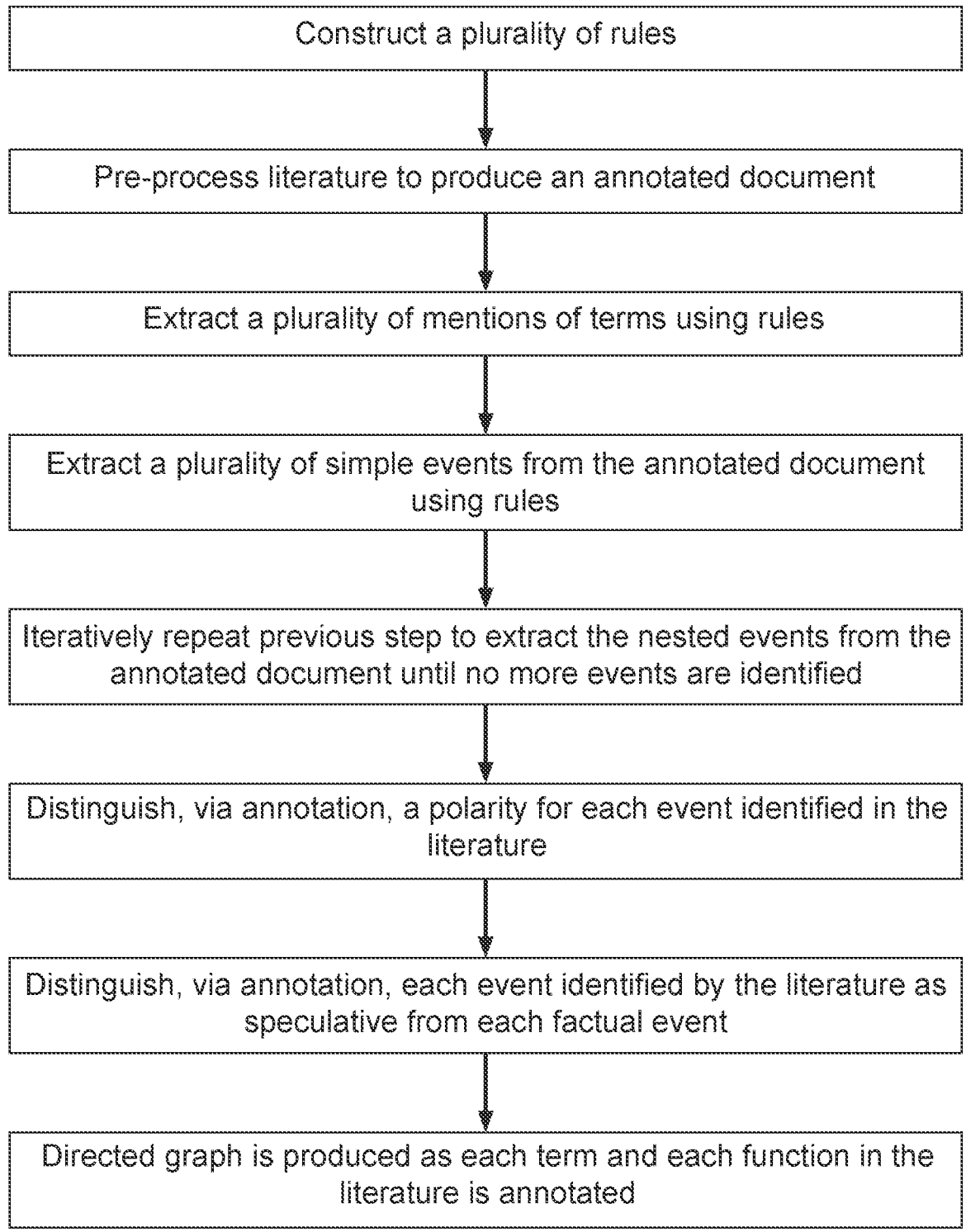
FIG. 1 shows a flowchart detailing an exemplary embodiment of the present method.

As used herein, the term "information extraction" or "IE" refers to a method for locating and extracting textual information from source documents containing unstructured or semi-structured information and data in order to generate and store structured cases of the extracted information. A "structured case" is simply an annotated version of the extracted information. The product of IE is a structured data set, comprising a plurality of structured cases, which may be utilized for data mining. "Rule-based IE" refers to the application of a plurality of rules that, when applied to a source document, produces the structured data set.

As used herein, the term "natural language processing" or "NLP" refers to methods of computer processing of language to perform tasks such as automated summarization, named entity recognition and extraction, relation extraction, sentiment analysis, etc.

As used herein, the term "syntactic dependency" refers to the relation between a pair of individual words within a sentence, where one word is always subordinate (the "dependent") to the other (the "head"). A label imposing a linguistic condition on the pair is typically employed. To illustrate, consider the pair of individual words: Mihai danced. Mihai is considered the dependent, danced is considered the head, and an appropriate linguistic condition would be a subject dependency (as Mihai is the subject and the dependent).

As used herein, the term "mentions" refers to instances in literature (i.e. a source document) where the name of an interaction or a physical entity is used (i.e., mentioned).

As used herein, the term "simple event" is defined as an action or interaction whose participants are entities. The term "nested event" refers to an action or interaction whose participants are physical entities and/or other actions or interactions. As used herein, the term "event argument" or "argument" refers to the one or more participants of a simple or nested event (e.g., physical entities or molecular interactions). The term "event trigger" or "trigger" refers to a word or phrase used to call mentions of a simple or nested event in source documents during execution of an IE method. As used herein, the term "event extraction" or "EE" refers to locating and extracting, from source documents, mentions of (simple or nested) events and arguments associated with said events, as well as deducing specific relational information between an event and its arguments or between an event and other events.

As used herein, the "processing pipeline" is an EE approach where the tasks of (1) applying a trigger to call mentions of an (simple or nested) event and (2) identifying event arguments included in the mentions are performed in separate steps instead of simultaneously. The distinction is significant since a given (simple or nested) event may be associated with multiple arguments and a given argument may be associated with multiple events.

As used herein, the term, "event predicate" refers to a verb or noun that indicates the event to be extracted. For example, in the statement "A phophorylates B", the event predicate is "phophorylates".

As used herein, the term "directed graph" refers to a searchable structured data set. A directed graph contains a set of nodes and directed links (or alternately, "edges") between these nodes. For example, the set of nodes may correspond to two entities (e.g. two proteins). The directed link (or edge) between these nodes may correspond to a molecular interaction between the proteins. To illustrate, the statement "A phophorylates B" leads to one directed link between nodes A and B.

As used herein, the term "part-of-speech (POS) tag" refers to a label identifying a category that captures the syntactic function of a word in a group of words, e.g., noun, verb, preposition, etc. POS tags are generally assigned using sequence models such as conditional random fields (CRF).

As used herein, the term "sequence model" refers to an ML method that labels sequences of words with relevant labels. For example, methods for POS tagging are implemented using a sequence model that assigns a part of speech to each word in the sequence of words.

As used herein, the term "named-entity recognition" (NER) refers to a sequence modeling task that identifies sections of text referring to mentions of entities of interest. Examples of such entities are names of people, places, and organizations (in an open-domain scenario), or proteins, simple chemicals and cellular locations (in the biomedical domain). Because these entities can be composed of multiple words, they are typically labeled using the BIO notation. For a given entity comprising a group of words, this representation uses the prefixes B—to denote words that are at the beginning of the group, I—to denote words that are inside the group, and O to denote words within the section of text that don't form part of any entity.

As used herein, the term "syntactic parsing" refers to the capturing of intra-sentence grammatical relations, or syntactic dependencies (e.g., subject, object). There are multiple possible representations for these dependencies. ODIN uses the Stanford typed dependencies representation, Stanford dependencies consist of directed and labeled binary relations between two words: head and dependent. For example, the relation between a verb and its subject is encoded as the subject relation where the verb is the head and the subject is the dependent. Furthermore, ODIN uses the collapsed dependencies representation, where dependencies involving prepositions and conjunctions are collapsed in order to get direct connections between content words.

As used herein, the term "grounding" refers to linking each entity to an entry in a public database, which is accessible via an Internet network. A non-exhaustive list of public databases used herein for grounding include: UniProt Knowledgebase, InterPro, HMDB, ChEBI, NCBI Taxonomy, Gene Ontology, UniProt Subcellular Locations, Gene Ontology, and MeSH.

As used herein, the term "token" refers to a sequence of characters, typically corresponding to a natural language word. As used herein, the term "tokenizer" refers to the process that segments natural language text into tokens.

As used herein, the term "grammar" refers to a set of syntactic patterns or rules that label the sequence of tokens in a sentence and/or the syntactic structure of the sentence.

As used herein, the term "coreference" is defined as the occurrence of two different mentions in the source documents referencing the same physical entity or referencing the same (simple or nested) event.

As used herein, the term "specification" is a (sentence, selection) pair. The term "specification" may refer to one or multiple such pairs. Note that the selection may be empty, as in the case of counter-examples. The algorithm is required to generate a single rule that exactly matches all highlights in the provided specification, and nothing more.

As used herein, the term "placeholder" refers to a search term that can be replaced with any valid rule element during the rule synthesis process.

As used herein, the term "state" refers to the information available at a given step of the rule generation; this information includes the current, intermediate form of the rule, as well as which parts of the specifications are matched, During rule generation, placeholders are iteratively expanded until we either (a) find a state that is a valid Odinson rule that satisfies the specification constraints, or (b) we reach a maximum number of steps, in which case no rule is produced. At each expansion, the algorithm determines the potential next states from the DSL, scores them based on their likelihood to be part of the completed rule, and adds them to a priority queue that is sorted in descending order of scores. The next state is then selected according to the queue.

DETAILED DESCRIPTION OF THE INVENTION

Referring now to FIGS. 1-8D, the present invention features a method for converting literature of a given field of study into a directed graph. In some embodiments, the given field of study may have a lexicon comprising a plurality of terms and a plurality of functions operating on, executed by, or descriptive of said terms. In one embodiment, each term may comprise one or more words. In another embodiment, the terms and functions are nodes of the directed graph. In some embodiments, lines connecting terms in the graph are functions and have a direction.

In some embodiments, the literature may comprise source documents from any domain. Examples of the literature include, but are not limited to, publications such as research publications and scientific articles, reports such as study reports, research reports, and scientific reports, emails, text messages, transcribed speeches, writable or editable documents, published presentation, and writable presentations.

According to some embodiments, the method may comprise constructing a plurality of rules, pre-processing the literature to produce an annotated document, extracting a plurality of simple events from the annotated document using the plurality of rules, iteratively repeating the extraction of the plurality of simple events to extract the nested events from the annotated document until no more events are identified, distinguishing, via annotation, a polarity for each event identified in the literature, and distinguishing, via annotation, each event identified by the literature as speculative from each factual event. From this method, the directed graph is thus produced as each term and each function in the literature is annotated. Further still, the directed graph is searchable, as a query can be matched with one or more terms, one or more functions, or a combination thereof.

In some embodiments, the plurality of rules may comprise a trigger comprising a specified word, sequence of specified words or sequence of specified part of speech attributes; and a plurality of arguments. In one embodiment, a trigger captures the predicate driving the event, e.g., the verb "promotes" indicates that a promotion event is present. In another embodiment, the arguments participate in the event, typically an agent (i.e., entity that drives the action) and a patient (i.e., the receiver of the action). For example, in a promotion event such as "pollution promotes malnutrition", the agent ("pollution") serves as the agent (or cause here), and the patient ("malnutrition") is the effect. In some embodiments, the arguments describe a pattern which can have one of two forms;

i) a surface pattern comprising a particular sequence of at least one word and parts of speech. The surface pattern can match any sequence of words which has the specified words and parts of speech in the specified order. In some embodiments, the surface rule may also be the trigger; or ii) a syntactic dependency pattern, hereinafter referred to as a syntactic pattern.

The syntactic pattern can describe a graph structure of a sentence. The graph structure may have nodes and edges corresponding to parts of speech, and each part of speech comprises at least one word. In some embodiments, the syntactic pattern may comprise an arrangement of nodes and edges in the graph structure which specify a particular syntactic structure. The plurality of arguments may further specify constraints on the words and attributes of words which can match the syntactic pattern. As a result, only a sentence with the specified syntactic structure and with only allowed words in the specified nodes and edges of the structure will match the syntactic pattern. In some embodiments, the syntactic pattern may comprise a declarative syntactic pattern, a passive syntactic pattern, a prepositional nominalization, a subject relative clause with optional apposition, a subject apposition syntactic pattern, or an object apposition paraphrastic causative individually or in combination.

In some embodiments, the pattern may comprise a head and a dependent. In one embodiment, the head may comprise an agent, cause, or subject in a sentence. The dependent may comprise a patient, effect, or object in a sentence. In another embodiment, an argument of the rule can specify a nested pattern as part of the pattern. A rule with a nested pattern may be a nested event rule, and a rule with no nested patterns is a simple event rule.

In one embodiment, the step of pre-processing the literature to produce an annotated document may comprise segmenting the literature into a plurality of sentences by detecting a plurality of word boundaries and a plurality of sentence boundaries within the literature, assigning a part-of-speech ("POS") tag to each word within each sentence according to the part of speech describing the word, and identifying a syntactical relation between each word in each sentence according to the POS tag of each word.

In some embodiments, an event is a particular occurrence in the literature of a sequence of words matching one of the plurality of simple event rules. At least two terms and a function are extracted from the event. In some embodiments, the terms and the function are words which are labeled with the parts of speech which match the pattern of the rule. One of the terms matches the head, and one of the terms matches the dependent of the pattern. At least two terms and function are added to the directed graph, where the terms are nodes and the function is a link between the nodes. The direction of the graph line is from the term which is the head to the term which is the dependent.

In some embodiments, the step of extracting a plurality of simple events from the annotated document using the plurality of rules may comprise searching the annotated text for triggers which are defined in the plurality of rules. Upon detecting a trigger of a rule, the step further comprises determining if the pattern defined by the rule matches the sequence of words or syntactic structure of a current sentence in the annotated text, where the current sentence is the sentence which contains the trigger. If the current sentence matches the pattern defined by the rule, then the specific words or groups of words corresponding to the parts of speech identified by the pattern are extracted. The step further comprises identifying the words or groups of words which are terms, the words or groups of words which are functions, and the words or groups of words which match existing events in the directed graph, if any, and identifying the terms or events corresponding to the head and the dependent of the pattern. The terms of the event are then added to the directed graph as nodes, where if a particular term is already represented in the graph, the number of mentions of the terms is accumulated via annotation. Further still, the step comprises adding a link between the terms denoted by the function, where a direction of the link is from the head term to the dependent term or event. If the link is already present in the graph, the number of mentions of the event is accumulated via annotation on the link. For example, when extracting the simple events from the annotated document and entering the terms and functions of the events into the directed graph, the direction of the graph link is from the agent argument to the patient argument.

According to one embodiment, for the step of extracting the nested events, the nested event may be a particular occurrence in the literature of a sequence of words matching one of the plurality of nested event rules. The dependent of the rule has been previously identified as an event. At least one term and a function are extracted from the nested event, where the terms and the function are words which are labeled with the parts of speech which match the pattern. One of the terms may match the head, and the event may match the dependent of the syntactic pattern. The terms, function, and event are then added to the directed graph. The terms are nodes and the function is a link between the nodes, and the direction of the graph line is from the term which is the head to the event which is the dependent. For example, in a non-limiting embodiment, each nested event contains an event previously extracted as an argument of the event, and the terms, functions and events of the nested event are entered into the directed graph. The direction of the graph link is from the agent argument to the patient argument, where the agent or patient, or both, may be another event.

According to another embodiment, the polarity may comprise a negation or non-negation of the event. Determination of polarity is based on analyzing the sentence from which the event was extracted and determining whether the sentence contains a negation in relation to the event. The annotation is applied to the link between the nodes of the event in the directed graph. In some embodiments, special treatment may be needed for statements that involve nested controls with different polarities. For example, in the text: "decreased PTPN13 expression enhances EphrinB1 phosphorylation", the predicate (or trigger) "enhances" seems to indicate that PTPN13 up-regulates the phosphorylation of EphrinB1. But, a careful inspection of the context indicates that it is the "decrease" of PTPN13 that enhances the phosphorylation. This is interpreted in the present invention as a polarity flip for the regulation of the phosphorylation (from positive to negative). The invention handles polarity correction by traversing the syntactic dependency path that connects the trigger of the corresponding event and all its arguments in the syntactic dependency graph, keeping track of polarity-reversal words. Adjectival modifiers that connect to the path at any point are also considered. For instance, in the above example shown, the adjectival modifier "decreased" signals the polarity reversal. The list of phrases that indicate polarity reversal may be maintained as an external database.

According to another embodiment, determination of speculation is based on analyzing the sentence from which the simple or nested event was extracted, and determining whether the set of words denote speculation with respect to the event. The annotation is applied to the line link between the nodes of the event in the directed graph. In some embodiments, speculative statements with a list of phrases that indicate hedged (or weaker) statements are detected. Speculative phrases include terms such as "hypothesize", "suggest", "whether". The list of phrases that indicate speculation may be maintained as an external database.

In other embodiments, the method of the present invention may further comprise performing named-entity recognition ("NER") on the annotated document to annotate mentions of the plurality of terms, and grounding each mention of a term by linking said mention to a corresponding entry in one or more external databases. Each mention of a term may comprise one or more words. A unique identifier may be generated and assigned to each mention of a term that has no corresponding entry in the one or more external databases.

In still other embodiments, the method may further comprise repeating performing named entity recognition on the annotated document to annotate mentions of nested entities. A nested entity may comprise a term which comprises a plurality of words, where a subset of one or more of the plurality of words matches a previously recognized named entity. The method may further comprise searching for alternate words or groups of words used to refer to the same term. If the part of speech of the syntactic pattern matches a common noun, a search is performed to identify a word or group of words representing a named entity in nearby text. The search can determine if the common noun refers to the named entity, and the event is linked to the node representing the named entity in the directed graph.

According to one embodiment, the method may further comprise performing quantity recognition on the annotated document to annotate mentions of quantities.

According to another embodiment, the method may further comprise assigning a polarity to a nested event contained within an event. The event can have a first polarity and the nested event can have a second nominal polarity. In some embodiments, the nested event may be assigned a combined polarity. In one embodiment, a positive and a negative polarity combine to form a negative polarity. In another embodiment, a negative and a negative polarity combine to form a positive polarity. In yet another embodiment, a positive and a positive polarity combine to form a positive polarity. A combined polarity can be assigned to the nested event via annotation.

According to yet another embodiment, the method may further comprise assigning a utility to an event. The utility may be a function of the number of mentions of the event, the polarities of the mentions, and the speculation annotations of the mentions. The number of mentions may be accumulated via annotation.

Figure 2:
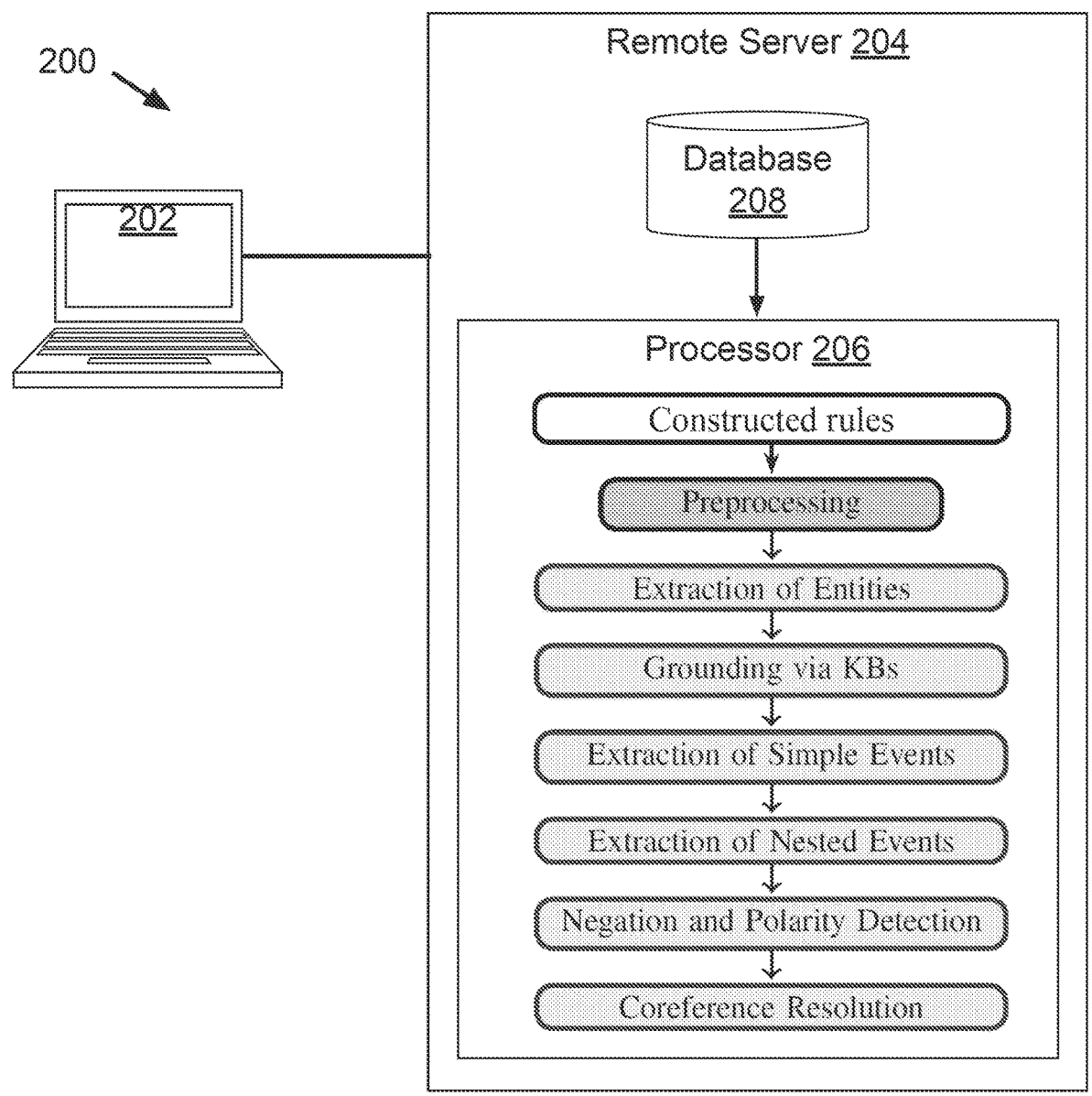
FIG. 2 shows an exemplary embodiment of the system of the present invention.
Figure 4:
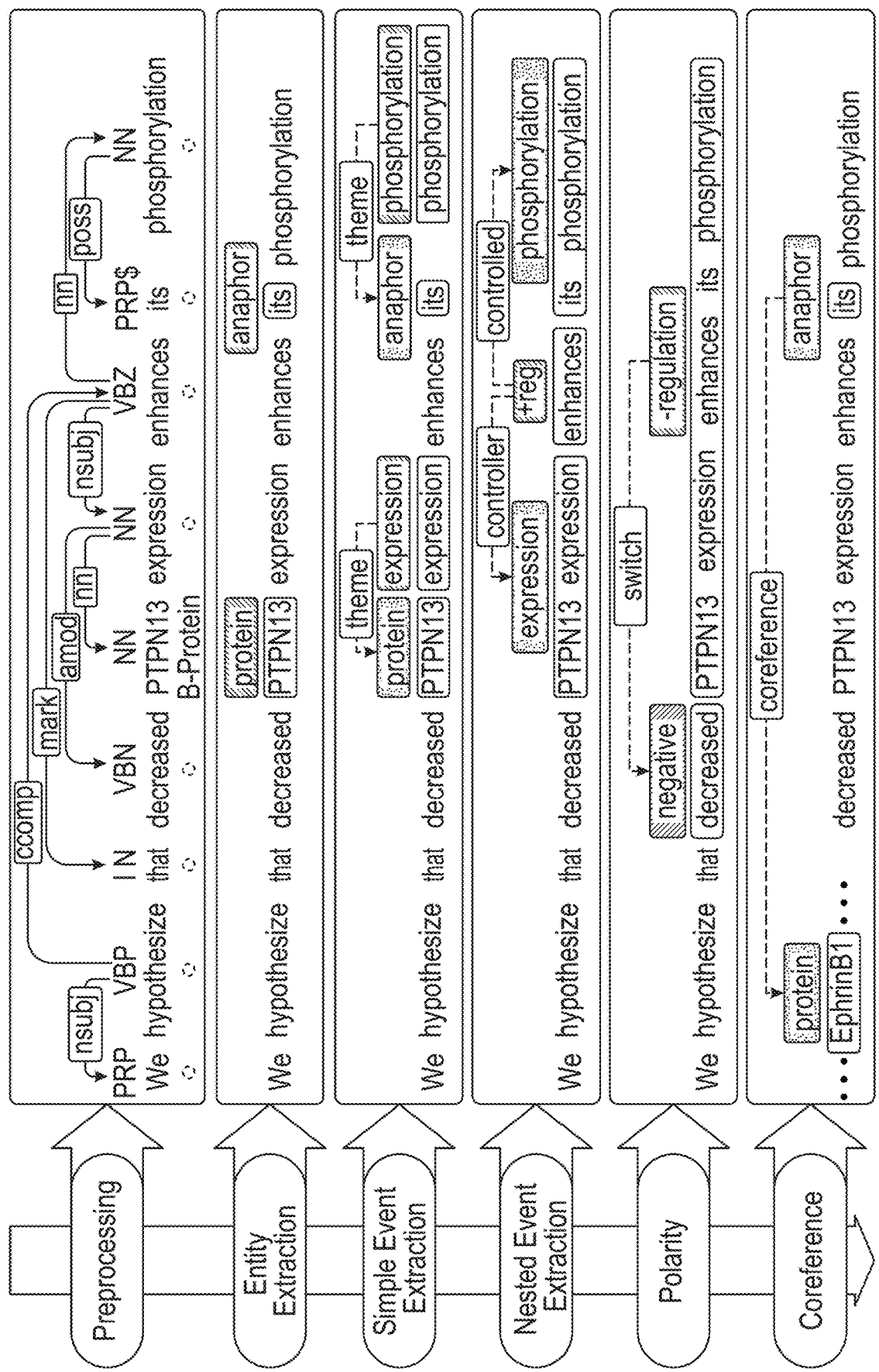
FIG. 4 shows a non-limiting schematic of the REACH system in conjunction with a walk-through example.

In some embodiments, as depicted in FIG. 2, the methods described herein may be implemented by a system. Thus, it is an objective of the present invention to provide a system (200) for providing a searchable, structured data set by converting literature of a given field of study into a directed graph. The given field of study may have a lexicon comprising a plurality of terms and a plurality of functions operating on, executed by, or descriptive of said terms. In some embodiments, the system may comprise a web-based user interface (202), a remote server (204), operatively coupled to the web-based user interface, comprising a database (208) storing a predefined domain grammar, and a processor (206), operatively coupled to the database (208), and configured to execute an algorithm of the pre-defined domain grammar to perform operations.

In one embodiment, the web-based user interface (202) may comprise a selection field providing a list of literature from which a user may select, a first input field enabling a user to optionally input text to serve as the literature, and a second input field accepting a query from a user. In another embodiment, the web-based user interface (202) may further comprise a third input field for accepting a user-defined grammar. In some embodiments, the processing of the selected literature may be based on the user-defined grammar.

In some embodiments, the pre-defined domain grammar may comprise an algorithm comprising a plurality of rules for converting selected literature to produce the directed graph. Conversion of said literature into the directed graph may comprise annotating the plurality of terms and the plurality of functions of the lexicon. In one embodiment, each rule may comprise a trigger, which is a specified word, sequence of specified words or sequence of specified part of speech attributes; and a plurality of arguments, which describe a pattern. In some embodiments, the pattern can have one of two forms:

i) a surface pattern comprising a particular sequence of at least one words and parts of speech; or ii) a syntactic dependency pattern, hereinafter referred to as a syntactic pattern.

In one embodiment, the surface pattern can match any sequence of words which has the specified words and parts of speech in the specified order. In some embodiments, the surface rule may also be the trigger. In another embodiment, the syntactic pattern may describe a graph structure of a sentence. The graph structure can have nodes and edges corresponding to parts of speech, and each part of speech may comprise at least one word.

In another embodiment, the syntactic pattern may comprise an arrangement of nodes and edges in the graph structure which specify a particular syntactic structure. In some embodiments, the plurality of arguments may further specify constraints on the words and attributes of words which can match the syntactic pattern. As a result, only a sentence with the specified syntactic structure and with only allowed words in the specified nodes and edges of the structure will match the syntactic pattern. In some embodiments, the syntactic pattern may comprise a declarative syntactic pattern, a passive syntactic pattern, a prepositional nominalization, a subject relative clause with optional apposition, a subject apposition syntactic pattern, or an object apposition paraphrastic causative individually or in combination.

In some embodiments, the pattern may comprise a head and a dependent. The head may comprise an agent, cause, or subject in a sentence. The dependent may comprise a patient, effect, or object in a sentence. In one embodiment, an argument of the rule can specify a nested pattern as part of the pattern. A rule with a nested pattern is a nested event rule, and a rule with no nested patterns is a simple event rule.

In some embodiments, the operations performed by the processor may comprise pre-processing the literature to produce an annotated document, extracting a plurality of simple events from the annotated document using the plurality of rules, iteratively repeating the step of extracting the plurality of simple events to extract the nested events from the annotated document until no more events are identified, distinguishing, via annotation, a polarity for each event identified in the literature, and distinguishing, via annotation, each event identified by the literature as speculative from each factual event. In preferred embodiments, the directed graph can be produced as each term and each function in the literature is annotated. A visualization of the directed graph may be generated, which can be optionally displayed to the user via the web-based user interface. Further still, the directed graph may be searchable, as a query can be matched with one or more terms, one or more functions, or a combination thereof. The second input field accepts the query and produces a search result by matching the query to one or more terms or one or more functions in the directed graph.

In one embodiment, the operation of pre-processing the literature to produce an annotated document may comprise segmenting the literature into a plurality of sentences by detecting a plurality of word boundaries and a plurality of sentence boundaries within the literature, assigning a part-of-speech ("POS") tag to each word within each sentence according to the part of speech describing the word, and identifying a syntactical relation between each word in each sentence according to the POS tag of each word.

In some embodiments, an event may be a particular occurrence in the literature of a sequence of words matching one of the plurality of simple event rules. At least two terms and a function may be extracted from the event, where the terms and the function are words which are labeled with the parts of speech which match the pattern of the rule. One of the terms can match the head, and one of the terms can match the dependent of the pattern. At least two terms and function may be added to the directed graph, where the terms are nodes and the function is a link between the nodes. In one embodiment, the direction of the graph line may be from the term which is the head to the term which is the dependent.

According to some embodiments, the operation of extracting the events may comprise searching the annotated text for triggers which are defined in the plurality of rules, and upon detecting a trigger of a rule, determining if the pattern defined by the rule matches the sequence of words or syntactic structure of a current sentence in the annotated text, where the current sentence is the sentence which contains the trigger. If the current sentence matches the pattern defined by the rule, the specific words or groups of words corresponding to the parts of speech identified by the pattern are extracted. In other embodiments, the operation may further comprise identifying the words or groups of words which are terms, the words or groups of words which are functions, and the words or groups of words which match existing events in the directed graph, if any, and identifying the terms or events corresponding to the head and the dependent of the pattern. The terms of the event may be added to the directed graph as nodes and a link is added between the terms denoted by the function, A direction of the link is from the head term to the dependent term or event. If a particular term is already represented in the graph, the number of mentions of the terms is accumulated via annotation. If the link is already present in the graph, the number of mentions of the event is accumulated via annotation on the link.

In some embodiments, a nested event is a particular occurrence in the literature of a sequence of words matching one of the plurality of nested event rules. The dependent of the rule has been previously identified as an event, and at least one term and a function are extracted from the nested event. The terms and the function are words which are labeled with the parts of speech which match the pattern.

One of the terms matches the head, and the event matches the dependent of the syntactic pattern. In some embodiments, the terms, function, and event are added to the directed graph, where the terms are nodes and the function is a link between the nodes. The direction of the graph line may be from the term which is the head to the event which is the dependent.

In one embodiment, the polarity may comprise a negation or non-negation of the event. Determination of polarity is based on analyzing the sentence from which the event was extracted and determining whether the sentence contains a negation in relation to the event. The annotation is applied to the link between the nodes of the event in the directed graph. In another embodiment, determination of speculation is based on analyzing the sentence from which the simple or nested event was extracted, and determining whether the set of words denote speculation with respect to the event. The annotation may be applied to the line link between the nodes of the event in the directed graph.

According to some embodiments, the operations performed by the processor (206) may further comprise performing named-entity recognition ("NER") on the annotated document to annotate mentions of the plurality of terms, where each mention of a term comprises one or more words; grounding each mention of a term by linking said mention to a corresponding entry in one or more external databases, where a unique identifier is generated and assigned to each mention of a term that has no corresponding entry in the one or more external databases; and performing NER on the annotated document to annotate mentions of nested entities, in which the nested entity may comprise a term which comprises a plurality of words. A subset of one or more of the plurality of words may match a previously recognized named entity.

According to other embodiments, the operations performed by the processor (206) may further comprise searching for alternate words or groups of words used to refer to the same term. If the part of speech of the syntactic pattern matches a common noun, a search is performed to identify a word or group of words representing a named entity in nearby text. The search can determine if the common noun refers to the named entity. The event may be linked to the node representing the named entity in the directed graph.

In yet other embodiments, the operations performed by the processor (206) may further comprise performing quantity recognition on the annotated document to annotate mentions of quantities.

In one embodiment, the operations performed by the processor (206) may further comprise assigning a polarity to a nested event contained within an event. The event may have a first polarity and the nested event may have a second nominal polarity. The nested event may be assigned a combined polarity. In some embodiments, a positive and a negative polarity can be combined to form a negative polarity, a negative and a negative polarity can be combined to form a positive polarity, and a positive and a positive polarity can be combined to form a positive polarity. The combined polarity can be assigned to the nested event via annotation.

In another embodiment, the operations performed by the processor (206) may further comprise assigning a utility to an event. The utility is a function of the number of mentions of the event, the polarities of the mentions, and the speculation annotations of the mentions. The number of mentions may be accumulated via annotation.

According to one embodiment, the web-based interface may further comprise a graph search interface. The graph search interface may comprise at least one search box used to specify at least one of a cause and an effect. The cause or effect may be a term or function that operates as a starting node for a search. The graph search interface may also comprise a second search box specifying a maximum number of links between nodes in the graph that the search may traverse. In one embodiment, the search results return all terms and functions corresponding to nodes in the graph within the specified number of links, along with the links connecting them to the starting node. The graph search interface may include a third search box used to further filter query results. In some embodiments, the filter searches for a text string or strings within the search results, and nodes not containing the text string and the links connecting to them are omitted from the results displayed.

In some embodiments, the graph search interface may further comprise a graph visualization displaying a network representation of the query results. Nodes indicating terms may be displayed as separated shapes on the visualization, and lines indicating functions linking the nodes are displayed. In one embodiment, links with a positive utility are shown in a first color and links with a negative utility are shown in a second color. In another embodiment, the width of a link is proportional to the utility of the link between the two nodes. In further embodiments, the graph search interface may include a table displaying the results as numbers in which each row corresponds to a line in the display and represents a link between the nodes in the graph, and each number corresponds to the utility of the connection.

According to another embodiment, the web-based interface may further comprise a model construction tool. A model may comprise the directed graph, and the model construction tool allows the user to edit the directed graph. The directed graph may have nodes and edges, and the nodes and edges may be a plurality of attributes. In some embodiments, the model construction tool may comprise a first tool function for adding a node comprising a term, a second tool function for adding an edge comprising a function, and a graph visualization display capable of displaying the nodes and edges of the directed graph. In some embodiments, the nodes may be displayed as shapes, and the edges may be displayed as lines connecting the nodes. In other embodiments, the model construction tool may further comprise a third tool function for importing search results from the graph search interface into the model construction tool. The nodes displayed in the search results may be added to the directed graph, and the links displayed in the search results are added as edges in the directed graph. The attributes of the nodes and edges in the search results are copied to the attributes of the nodes and edges in the directed graph. In still other embodiments, the model construction tool may further comprise a fourth tool function for merging imported search results with existing nodes and edges of the directed graph, a fifth tool function for deleting nodes from the directed graph, a sixth tool function for deleting edges from the directed graph, a seventh tool function for editing attributes of the nodes and edges of the directed graph, and a eighth tool function for saving the model for later rework.

According to some embodiments, the present invention may feature one or more non-transitory computer-readable media. The media may contain a predefined domain grammar having computer-executable instructions. In preferred embodiments, the computer-executable instructions may be the algorithm comprising the plurality of rules for converting selected literature to produce the directed graph, as previously described herein. When said instructions are executed by a computing system, the computing system can perform the operations previously described herein.

According to one embodiment of the present invention, the method described herein may be implemented to convert biomedical literature into a directed graph by annotating a plurality of mentions of a plurality of signaling pathway fragments in the biomedical literature. A signaling pathway may be defined as a sequence of molecular interactions occurring within a cell to carry out a cell function. The term "signaling pathway fragment" thus refers to any component (e.g., a molecular interaction or an interacting molecule) in said sequence of molecular actions. A signaling pathway fragment may comprise a molecular interaction or a physical entity participating in the molecular interaction. In some embodiments, using the plurality of constructed rules previously described herein, the method may comprise pre-processing the biomedical literature to produce an annotated document. Pre-processing steps may comprise segmenting the biomedical literature into a plurality of sentences by detecting a plurality of word boundaries and a plurality of sentence boundaries within the biomedical literature. A POS tag may then be assigned to each word within each sentence according to a part of speech associated with the word. Following, a grammatical relation between each word in a sentence may be identified according to the POS tag of each word. In this way, each sentence in the biomedical literature is annotated, via each grammatical relation and via each POS tag, producing the annotated document.

In other embodiments, NER may be performed on the annotated document to annotate the plurality of mentions of the plurality of physical entities. Each mention of a physical entity may comprise a group of words, herein referred to as a word group. A plurality of text sections of the annotated document, each containing one or more mentions of one or more physical entities, may then be identified. For each text section identified, each word beginning a word group of a mention of a physical entity may be annotated with a B, each word inside a word group may be annotated with an I, and each word not belonging to a word group may be annotated with an O.

In additional embodiments, each mention of a physical entity may be grounded by linking each mention to a corresponding entry in one or more external databases. A unique identifier may be generated and assigned to each mention without a corresponding entry in any of the external databases.

Further embodiments include locating a plurality of mentions of a plurality of molecular interactions, herein referred to as simple events, in the annotated document. A first set of trigger phrases, each characteristic of an individual simple event, may be used to locate each mention of each simple event. Once located, a first grammar may be used to identify one or more physical entities participating in each simple event. A grammar may be defined as a set of syntactic rules that identify a set of regularities in a way the one or more physical entities are expressed in the annotated document. Each of the one or more physical entities may then be annotated according to the role it plays in the associated simple event. In other embodiments, the set of syntactic rules comprising the first grammar and the set of syntactic rules comprising the second grammar may comprise, individually or in combination, a declarative syntactic pattern, a passive syntactic pattern, a prepositional nominalization, a subject relative clause with optional apposition, a subject apposition syntactic pattern, or an object apposition paraphrastic causative.

In some embodiments, a plurality of mentions of a plurality of nested events is located in the annotated document. Here, a nested event is a molecular interaction whose participants comprise one or more physical entities or one or more other molecular interactions. A second set of trigger phrases, each characteristic of an individual nested event, may be used to locate each mention of each nested event. Once located, a second grammar may be used to identify the one or more physical entities or the one or more other molecular interactions participating in each nested event. Each of the one or more physical entities or the one or more other molecular interactions may be annotated according to the role it plays in the nested event. Thus, each physical entity and each molecular interaction in the biomedical literature is annotated, resulting in the directed graph. The directed graph is searchable, as a query may be matched to one or more physical entities and/or one or more molecular interactions.

Non-limiting examples of entities include species, cell lines, organs, cell types, families, cellular or subcellular components, simple chemicals, sites, bioprocesses, and gene or gene products (including genes and proteins). In other embodiments, the plurality of simple events may include, but not be limited to, phosphorylation, ubiquitination, hydroxylation, sumoylation, glycosylation, acetylation, farnesylation, ribosylation, methylation, translocation, binding or hydrolysis.

In some embodiments, two mentions using a different set of words to describe a same term or a same function are linked. A rule-based sieve architecture may be employed for linking the two mentions as described in *An Investigation of Coreference Phenomena in the Biomedical Domain*, by Bell, et. al, which is incorporated herein in its entirety. In other embodiments, a group of words indicating a negation of a simple event or a negation of a nested event may be annotated as such.

A further embodiment distinguishes a simple event (or a nested event) identified by the literature as speculative from a factual simple event (or a factual nested event) by annotation. The determination of speculation may be based on locating a set of words describing the simple (or nested) event and determining whether the set of words contain speculative language.

In an additional embodiment, a utility is assigned to a group of words that comprise a nested event whose participants have opposing polarities. A polarity may be defined as an expression of degree descriptor modifying a physical entity or a molecular interaction. To illustrate, consider the group of words: decreased PTPN13 expression enhances EphrinB1 and Erk1 phosphorylation. In this grouping, the participants of the nested event are the physical entity PTPN13 and the simple event phosphorylation. The polarity of the physical entity PTPN13 is negative (since it is decreased), while the polarity of the simple event phosphorylation is positive (since it is enhanced). An appropriate utility to be assigned to this grouping of words may be regulation, since a concentration of PTPN13 regulates phosphorylation.

EXAMPLE

The following is a non-limiting example of the present invention. Said example is not intended to limit the invention in any way, equivalents or substitutes are within the scope of the invention.

Furthermore, while the following example illustrates the present invention being applied in the biomedical domain, it is to be understood that the invention can be applied in non-biomedical domains. Some non-limiting domains where the present technology could be applied include children's health or intelligence. For example, the domain of children's health is multi-disciplinary, and to understand what causes malnutrition in children, one has to inspect biology, environmental sciences (there are links between pollution and malnutrition), education (the education of the parents impacts the well-being of the child), etc. Similarly, this type of influence relations impacts the field of intelligence, where an analyst might mine for influence patterns that explain a certain terrorist event.

Building a Domain

Rule-based systems have been shown to perform at the state-of-the-art for event extraction in the biology domain (Peng et al., 2014; Bui et al., 2013). The domain, however, is not without its challenges. For example, it is not uncommon for biochemical events to contain other events as arguments. Consider a sentence containing two events, one event referring to the biochemical process known as phosphorylation, and a recursive event describing a biochemical regulation that controls the mentioned phosphorylation. A minimal set of rules that capture these two events is introduced. Here, it is assumed the simple entities have already been detected through a named entity recognizer. When a rule matches, the extracted token spans for trigger and arguments, together with the corresponding event and argument labels are dispatched to a labeling action. By default, these actions create an Event Mention Scala object with the corresponding event label, and the extracted named arguments. Custom actions may be defined as Scala code, and be attached to specific rules. For example, a custom action may trigger coreference resolution when a rule matches a common noun, e.g., the protein, instead of the expected named entity.

A second rule captures the recursive event. Importantly, this rule takes other events as arguments, e.g., the controlled argument must be an event mention. To guarantee correct execution, the runtime repeatedly applies the given EE grammar on each sentence until no rule matches. For example, the rule may not match in the first iteration because no event mentions have been created yet, but would match in the second iteration. This process can optionally be optimized with rule priorities. For example, the priorities enforce that the second rule is executed only in an iteration following the first rule. Utilizing rule priorities allows for a derivational construction of complex events or complete grammars from their components. Once the grammar has been defined, the entire system can be run in less than 10 lines of code. The output of this code is a collection of event mentions, i.e., instances of the EventMention class.

A non-limiting example of the grammar shown in FIG. 6 operates as follows:

1. The ner rule converts the output of an external entity recognizer into ODIN entity mentions labeled Protein. In general, ODIN mentions are data structures that store the output of a matched rule. For example, in this instance, the mention created by this rule captures the fact that the span of tokens from 1 to 2 (exclusive) and from 6 to 7 correspond to a named entity labeled Protein. In most situations, mentions are transparently created and managed by the ODIN runtime system.

2. The ubiq rule matches a ubiquitination event, which is anchored around a nominal predicate (trigger), "ubiquitination", and has two arguments: a mandatory theme, which is syntactically attached to the verbal trigger through the preposition "of", and an optional cause, attached to the trigger through the preposition "by". Unlike entity mentions, ODIN event mentions keep track of their participants (e.g., themes and causes), in addition to the matching text. The resulting event mention is assigned the Ubiquitination label. The hypernym labels SimpleEvent and Event are added automatically, according to the provided taxonomy (as shown in the figure). The taxonomy is a tree structure, which defines a hierarchy of labels to be assigned to each mention.

3. The negreg rule implements a negative regulation driven by a verbal predicate, where the arguments are its nominal subject and its object. Note that one of the arguments is an event produced by the ubiq rule. First, a protein mention is captured as the event theme, followed by a token with the following attributes: 1. the lemma is "inhibit"; 2. the POS tag starts with "V" (a verb). This token is captured as the event trigger. Then an optional determiner is matched followed by an existing event mention, which is captured as the current mention's theme.

At runtime, these three rules are automatically organized in a cascade, where the first rule finds the Protein mentions, which are then used to populate the event mention extracted by the second rule. Lastly, the third rule is executed, which uses the outputs of the first and second rules to generate a nested event. Referring to FIG. 6, the ner rule is necessary to capture the IOB output of the NER. The ubiq rule matches a ubiquitination event, which is anchored around a nominal predicate (trigger), "ubiquitination", and has two arguments: a mandatory theme, which is syntactically attached to the verbal trigger through the preposition "of", and an optional cause, attached to the trigger through the preposition "by". The resulting event mention is assigned the Ubiquitination and Event labels. The negreg rule implements a negative regulation driven by a verbal predicate. Note that one of the arguments is an event produced by the ubiq rule. As discussed, the ODIN runtime guarantees that the latter rule completes before the former.

Referring to FIG. 3B, a syntax-based grammar is considerably more general than a surface-based grammar. For example, the syntax-based grammar correctly finds two ubiquitination events and two negative regulations in the sentence "CYLD inhibits the ubiquitination of both TRAF2 and TRAF6" because the dependency graph correctly connects "ubiquitination" to "TRAF2" and "TRAF6". On the other hand, the surface-based grammar misses the ubiquitination event involving "TRAF6" (and the negative regulation of this ubiquitination), because the last two tokens of the sentence are not explicitly handled by the rules. However, syntax-based grammars assume that a syntactic parser is available and produces robust output. This is not always true, especially in domain-specific settings. In such situations it is beneficial to mix syntax and surface rules, or rely solely on the latter.

Details of the Rule Language

Syntactic Dependency Patterns

To mitigate language sparsity, ODIN provides the capability to match patterns over a sentence's dependency graph. With these patterns, ODIN captures event or relation structures. Event structures are composed of a predicate and its corresponding arguments, and relation structures are only composed of arguments (no predicate).

When retrieving an event, the predicate, or trigger, is defined using a surface pattern over sequences of tokens and their associated attributes, such as a word's lemma form or its part-of-speech (POS) tag. Event arguments are identified by dependency paths anchored at the matched trigger. These arguments have semantic constraints represented as labels (e.g., Protein or Event in the negreg rule in FIG. 6). Syntactic patterns for relations between mentions are also supported by first specifying a previously found mention as an anchor; the rest of the arguments are identified by dependency paths in the style of syntactic rules for events. The anchor mention is specified by giving it a name other than trigger and a desired label, e.g., anchor:Label.

Predicate-argument Syntactic Paths: The dependency path between a predicate and an argument is composed of hops and optional filters. The hops are edges in the syntactic dependency graph; the filters are token constraints on the nodes (tokens) in the graph. Hops can be incoming or outgoing. An outgoing hop follows the direction of the edge from HEAD ▢ DEPENDENT; an incoming hop goes against the direction of the edge, leading from DEPENDENT ▢ HEAD. For example, in FIG. 3B, the dependency "inhibits" ▢ "ubiquitination" is outgoing ("inhibits" is the head), but it is considered incoming when traversed in the other direction: "ubiquitination" ▢ "inhibits".

An outgoing dependency is matched using the>operator followed by a string matcher, which operates on the label of the corresponding dependency, e.g., >nsubj. Because most patterns use outgoing hops, (i.e., HEAD DEPENDENT), the > operator is implicit and can therefore be omitted. An incoming relation (i.e. DEPENDENT ▢ HEAD) is matched using a required < operator followed by a string matcher. "»" is a wildcard operator that can be used to match any outgoing dependency. "«" is a wildcard operator that can be used to match any incoming dependency. In addition to directionality, dependency patterns support alternation, grouping, and the common regular expression quantifiers. For example, the pattern "nsubj prep_of?" matches exactly one outgoing nsubj hop followed by an optional outgoing prep_of.

Named Arguments: The arguments in a dependency pattern are written using the name:label=path syntax, where label is the label of an existing ODIN mention. The path must lead to a token contained in a mention with the specified label. ODIN captures argument parity in events through argument quantifiers. Arguments can be made optional with the ? operator. The + operator is used to indicate the creation of a single event mention containing all matches for that argument. The * is similar to +, but also makes the argument optional. If the exact number of arguments with the same name is known, it can be specified using the exact repetition quantifier {k}. The ubiq rule in FIG. 6 shows an optional cause argument.

Token Constraints: Token constraints can be used to restrict a dependency pattern by adding lexical constraints at any point of the path. Tokens are described using one or more constraints on lexical, morphological, or semantic attributes written in the form [attribute=value]. The value of these token attributes may be given as exact strings or regular expressions (e.g. [lemma=/[eo]r$/] for all lemmas ending in "er" or "on". More complex constraints can be expressed using boolean expressions.

Lookarounds as Contextual Constraints: Dependency patterns support non-capturing lookaround expressions to constrain syntactic context. The lookaround syntax is (?=pattern) for positive assertions and (?!pattern) for negative assertions.

Surface Patterns

The same fundamental features of dependency patterns are also supported by surface patterns, which operate independently of syntax.

Named Arguments: Surface patterns may be used to describe events or relations using named arguments that are created either on-the-fly using (?<argname> token sequence) syntax, or in reference to an existing mention by using the ©argname:Label syntax.

Lookarounds as Contextual Constraints: Surface pattern may be honed with lookbehind and lookahead expressions that impose constraints on the sentential context of a match. These assertions may be either positive (i.e., the contained pattern must exist) or negative (i.e., the contained pattern must not exist). Lookbehinds use the (?<=token sequence) syntax for positive assertions and (?<! token sequence) for negative assertions; positive lookaheads use (?=token sequence), while negative lookaheads are specified using (?! token sequence). Notably, ODIN supports efficient unrestricted variable length lookbehinds, which is unique to present invention and uncommon for regular expression engines.

Taxonomy

Figure 5:
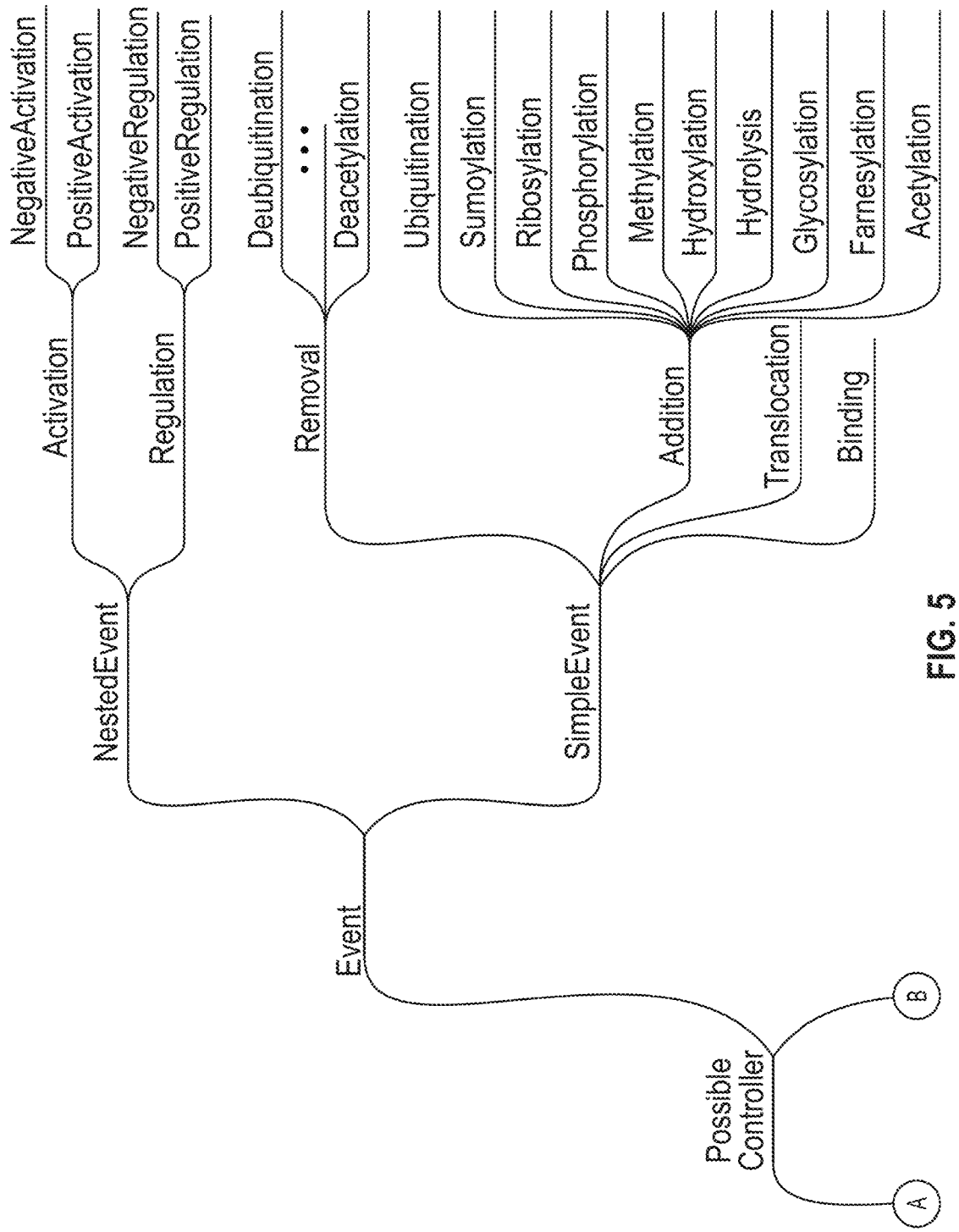
FIG. 5 shows a non-limiting Taxonomy of some entities and events recognized by REACH. Though abbreviated, the Deletion events mirror those listed under Addition.
Figure 5:
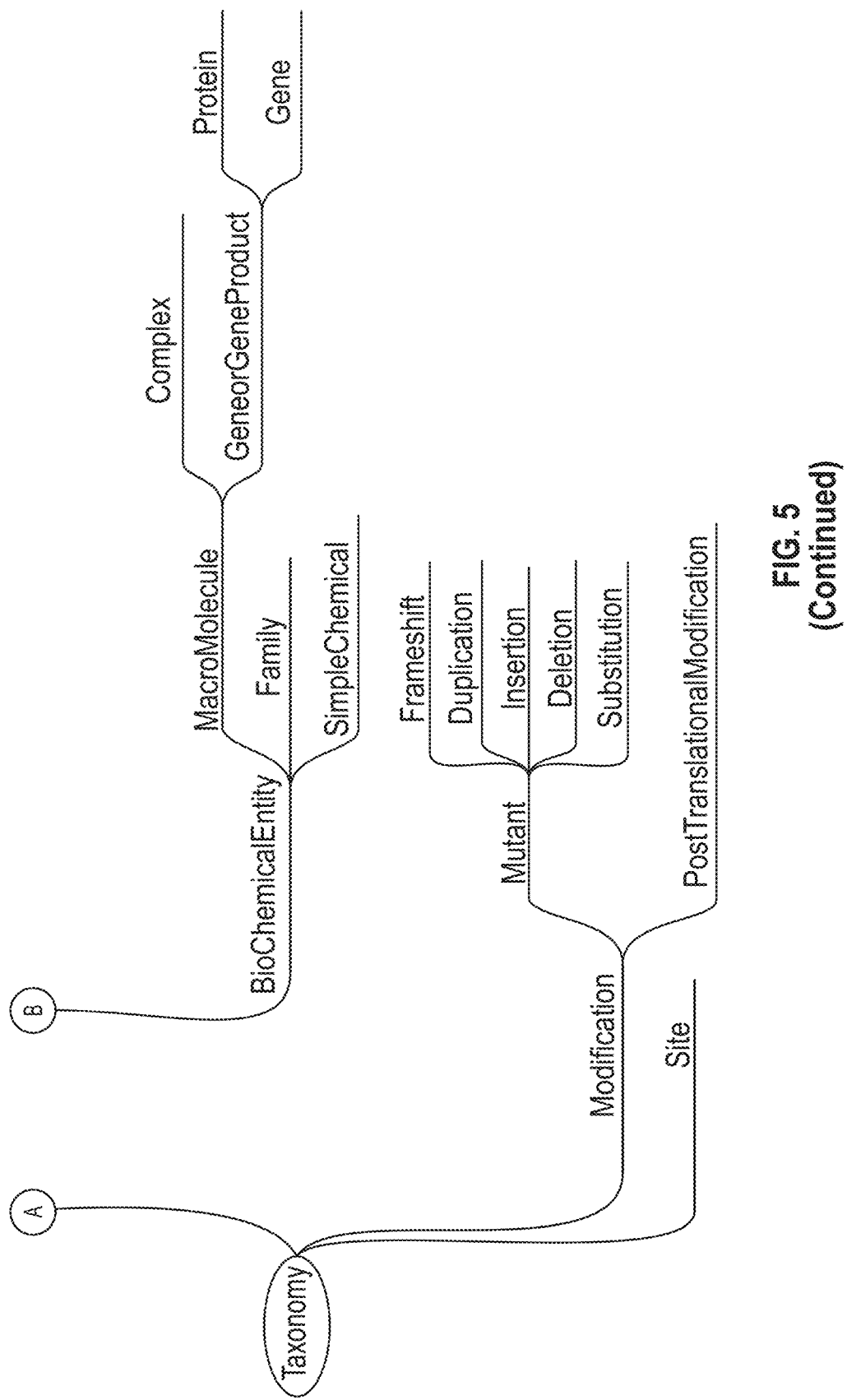

The rules can assign more than one label to an extracted mention. This allows for defining an ad-hoc taxonomy that states that a Ubiquitination is also an Event. The ability to define ad-hoc taxonomies is useful when developing small IE systems, but this can become cumbersome for larger domains. To address this, ODIN supports a formal taxonomy where the label hierarchy is written as a tree (or forest), as shown in FIG. 5. Taxonomies are encoded as lists of dictionaries that display the hierarchy of labels in a clear and readable way. When an explicit taxonomy is available, a rule can use a single label which will include all of its parent labels implicitly. This enforces consistency in the labels of the resulting mentions, and also catches typographical errors by not allowing the use of labels missing from the taxonomy.

Non-limiting examples of syntactic patterns are shown in TABLE 1. Non-limiting examples of rule templates are provided in TABLE 2, which correspond to the syntactic variants in TABLE 1. Capitalizing on these patterns, the extraction system was implemented using 154 unique rule templates, as shown in TABLE 3.

TABLE 1

Common syntactic variations shared among event types.
Combinations of these syntactic variations are also considered. For
example, an appositive subject relative plus passivization: "Pde2, which has been found
to hydrolyze Ras, activates MEK."

| Name | Description | Example |
| --- | --- | --- |
| Declarative | The theme (the thing acted on by the verb) is the direct object of a verb. | "Smurf1 and Smurf2 degrade and ubiquitinate RhoA." |
| Passive | The theme is the syntactic subject of a verb phrase. | "RhoA is ubiquitinated and degraded by Smurf1 and Smurf2." |
| Prepositional Nominalization | The trigger is in noun form and entities are in prepositional phrases. | "The ubiquitination and degradation of RhoA by Smurf1 and Smurf2 increased." |
| Object Nominalization | The trigger is in noun form and with the theme forms a noun-noun compound. | "RhoA ubiquitination and degradation by Smurf1 and Smurf2 increased." |

TABLE 1-continued

Common syntactic variations shared among event types.
Combinations of these syntactic variations are also considered. For
example, an appositive subject relative plus passivization: "Pde2, which has been found
to hydrolyze Ras, activates MEK."

| Name | Description | Example |
|---|---|---|
| Subject Nominalization | The trigger is in noun form and with the cause forms a noun-noun compound. | "Smurf1 ubiquitination and degradation of RhoA increased." |
| Subject Relative Clause (+optional Apposition) | The trigger and theme are located in a relative clause which modifies the cause. | "Its many abnormal phenotypes can be rescued via Pde2, which specifically hydrolyzes cAMP." |
| Object Relative Clause (+optional Apposition) | The trigger and cause are located in a relative clause which modifies the theme. | "We measured transcription activation in the presence of cAMP, which is hydrolyzed by CRP." |
| Subject Apposition | The cause is in an appositive phrase. | "Via yeast two-hybrid screening, we found that a novel protein, A20, binds to ABIN." |
| Object Apposition | The cause is in an appositive phrase. | "Via yeast two-hybrid screening, we found that A20 binds to a novel protein, ABIN" |
| Paraphrastic Causative | The trigger is separated from an entity by a verb. | "Smurf1 causes the degradation of RhoA." |

TABLE 2

Rule template examples for each variant listed in TABLE 1.

| Name | Template |
|---|---|
| Declarative | - name: declarative_transitive<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^V/]<br>    cause:BioChemicalEntity+ = >nsubj<br>    theme:BioChemicalEntity+ = >dobj |
| Passive | - name: declarative_transitive<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^V/]<br>    cause:BioChemicalEntity+ = >agent<br>    theme:BioChemicalEntity+ = >subjpass |
| Prepositional Nominalization | - name: prepositional_nominalization<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^N/]<br>    cause:BioChemicalEntity+ = >prep_by<br>    theme:BioChemicalEntity+ = >prep_of |
| Object Nominalization | - name: object_nominalization<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^N/]<br>    cause:BioChemicalEntity+ = >prep_by<br>    theme:BioChemicalEntity+ = >nn |
| Subject Nominalization | - name: subject_nominalization<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^N/]<br>    cause:BioChemicalEntity+ = >nn<br>    theme:BioChemicalEntity+ = >prep_of |
| Subject Relative Clause (+ optional Apposition) | - name: subject_relative_clause<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^V/]<br>    cause:BioChemicalEntity+ = <rcmod<br>    theme:BioChemicalEntity+ = dobj |
| Object Relative Clause (+ optional Apposition) | - name: object_relative_clause<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^V/]<br>    cause:BioChemicalEntity+ = agent<br>    theme:BioChemicalEntity+ = <rcmod |
| Subject Apposition | - name: subject_apposition<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^V/]<br>    cause:BioChemicalEntity+ = <appos >nsubj<br>    theme:BioChemicalEntity+ = >dobj |
| Object Apposition | - name: object_apposition<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^V/]<br>    cause:BioChemicalEntity+ = >nsubj<br>    theme:BioChemicalEntity+ = >dobj >appos |
| Paraphrastic Causative | - name: paraphrastic_causative<br>  label: [Ubiquitination, AdditionEvent, SimpleEvent, Event, PossibleController]<br>  priority: 7<br>  type: dependency<br>  pattern: \|<br>    trigger = [lemma=ubiquitinate & tag=/^N/]<br>    cause:BioChemicalEntity+ = <dobj [lemma=cause] >nsubj<br>    theme:BioChemicalEntity+ = >prep_of |

TABLE 3

Number of rule templates in REACH's grammars.

| Type | Syntax | Surface | Total |
| --- | --- | --- | --- |
| Entities | 0 | 15 | 15 |
| Generic entities | 0 | 2 | 2 |
| Modifications | 0 | 6 | 6 |
| Mutant | 0 | 9 | 9 |
| Total | 0 | 32 | 32 |
| Simple events | 15 | 11 | 26 |
| Binding | 30 | 7 | 37 |
| Hydrolysis | 8 | 2 | 10 |
| Translocation | 12 | 0 | 12 |
| Positive regulation/activation | 16 | 4 | 20 |
| Negative regulation/activation | 14 | 3 | 17 |
| Total events | 95 | 27 | 122 |
| Total | 95 | 59 | 154 |

The example grammar described herein highlights the following critical advantages of the invention:

1. It is concise. With only the three rules above, a grammar is implemented that captures two types of events (ubiquitination biochemical reactions, and their regulations), the entities on top of which they operate, i.e., proteins, as well as a taxonomy of entities and events in the given domain. To the inventors knowledge, no other NLP platform offers such an environment. As mentioned, one benefit of this conciseness is that the end-user may deploy a new grammar with minimal effort and overhead.

2. This is the only platform in which the same grammar mixes surface information, syntactic information, and semantics. For example, in FIG. 2, the tier rule recognizes Protein entities using a surface rule, i.e., a rule that operates directly over the left-to-right sequence of words as they occur in the sentence. In particular, this rule requires that the first word in the entity name be one tagged with the B-Protein label (meaning "Beginning of a protein name") produced by an external named entity recognizes, followed by zero or more (indicated by the * operator) words containing the Protein label, which means "Inside a protein name". In contrast, the two event rules (ubiq and negreg) operate over syntactic information, e.g., the cause of the negative regulation must be the subject of the verb "inhibit". Further, the grammar captures semantic information as well, i.e., the taxonomy included models of the semantic structure of the domain.

Visualization

The above EE system may be accompanied with an interactive web-based tool for event grammar development and results visualization. The UI can accept free text to match against, and can be configured to run either a predefined domain grammar or one provided on-the-fly through a text box, allowing for the rapid development and tuning of rules. The web interface is implemented as a client-server web application which runs the EE system on the server and displays the results on the client side. The application's client-side code displays both entity and event mentions, as well as the output of the text preprocessor (to help with debugging).

Machine Reading Approach

At a high level, REACH uses a cascade of rule-based and statistical techniques to read the content of a paper and produce mentions of molecular events that describe fragments of a signaling pathway. The steps of this sequence proceed from low- to high-complexity representations, each building on the output of the previous steps. These mentions are constructed internally in a representation inspired by the BioPAX standard language. Notably, REACH can capture biochemical conversions in detail where entities go through "state" changes such as becoming phosphorylated, or changing their subcellular location. REACH also captures controllers or catalysts of these conversions (when present in text). Similar to BioPAX, these are represented using a composite structure where events can have other events as their participants, allowing for arbitrarily complex logic. REACH implements the extraction of control relations between entities (e.g., "A activates B", where A and B are proteins). Although such relations are ambiguous relative to a mechanistic conversion representation (e.g., the above example may be translated to "A catalyzes the phosphorylation of B" or to some other biochemical mechanism), they provide valuable information to domain experts.

Preprocessing

REACH first preprocesses the text with NLP tools specifically modified for the biomedical domain. Preprocessing includes sentence and word segmentation, POS tagging, and syntactic parsing. The sentence and word segmentation step detects both sentence and word boundaries in the input text. There are subtle but important differences between the tokenization of open-domain text and biomedical content. For example, dashes that occur within a word are not considered separators when segmenting open-domain text, but they tend to function as word separators in biomedical texts. For example, segmenting the text "GAP-mediated" at the dash is crucial for the downstream components to understand that this text contains a catalysis driven by GAP. Similarly, not considering the dash as separator would prohibit the downstream components from recognizing members of protein complexes, which typically appear as dash separated in text. To handle these phenomena, a custom segmenter was developed in-house, following the tokenization specification of the BioNLP corpus. For POS tagging and syntactic parsing, REACH uses Stanford's CoreNLP toolkit, which has been trained using a combination of two corpora: the Penn Treebank, a corpus that merges several non-biomedical genres such as IBM computer manuals, and Wall Street Journal articles, and the GENIA corpus, which is a manually annotated corpus of 2000 MEDLINE abstracts. Including the GENIA annotated documents as part of the parser's training corpus makes the parser more robust to syntactic structures often found in biomedical literature.

Entity Extraction

Next, a custom named entity recognizer (NER) component is used to recognize mentions of relevant physical entities by type, i.e., protein family, cellular component, simple chemical, site, and gene or gene product (this last category includes genes and proteins). The complete list of entities recognized by REACH as well as the biochemical events is listed in the taxonomy in FIG. 5. The custom NER uses a hybrid approach that combines a rule-based component with a statistical one. The rule-based component recognizes all mentions of known entity names (and their synonyms) from the knowledge bases (KBs). Additional grammar rules were written to capture entities that are not adequately covered by these KBs such as cellular components or sites of biochemical reactions. The statistical model is implemented using CoreNLP's conditional random fields (CRF) sequence classifier, trained on the BioCreative corpus. This dataset supports solely mentions of gene or gene products. The hybrid NER combines the output of the two components, prioritizing the rule-based component when overlaps are detected. Next, REACH "grounds" the physical entities discovered by linking the textual mentions to ids of actual entities in the knowledge bases. Lastly, REACH detects mentions of gene mutations and protein post-translational modifications (PTMs), and attaches them to the corresponding entities. This is implemented with a subsequent grammar that focuses on detecting changes of states in the previously extracted entity mentions, e.g., "phosphorylated KRAS", "wild type EHR".

Event Extraction

Once REACH has determined which entities are mentioned in the text, it extracts the biochemical processes in which they participate. A two-step bottom-up strategy is used for event extraction, following biochemical semantics inspired by BioPAX. First, biochemical reactions that operate directly on entities are identified, ignoring, for now, their catalysts and other controllers, e.g., phosphorylation of a protein. Following NLP terminology, these events are called "simple". Second, the processes that control these conversions are determined, e.g., the catalysis of this phosphorylation by a kinase. These events are called "nested", due to the fact that they have other events as their targets, e.g., the above catalysis operates on a phosphorylation simple event.

One notable and advantageous contribution of the present invention is the small number of rules used for event extraction. This is achieved by first identifying several general syntactic variations shared among event mentions, and then reusing the same syntactic structures for all event types.

The aforementioned intuition was implemented using ODIN's rule templates, i.e., rules that contain parameterizable patterns. For example, one template was used to describe a declarative syntactic pattern, but left the actual verb as a parameter to be instantiated later. The specific verb to be used at runtime is initialized with specific values for the different event types (e.g., "phosphorylate" for phosphorylation events).

In some iterations, the present invention supported 12 different types of simple events. Nine of these are biochemical reactions: phosphorylation, ubiquitination, hydroxylation, sumoylation, glycosylation, acetylation, farnesylation, ribosylation, and methylation. All of these reactions involve the covalent modification of a protein. The difference between these events and the PTMs extracted in the previous step is that these events refer to the actual act of modifying the protein by attaching a functional group to it, and the PTMs described in the previous step refer to proteins that have already been modified (potentially as a result of simple events mentioned previously in the paper).

Nested events are processes that control other events, e.g., catalysis and inhibition. REACH recognizes both positive (e.g., "promotes") and negative (e.g., "inhibits") controls. It is also possible to chain the control logic, e.g., the co-modulation of catalysis. Following BioNLP terminology, these types of events are collectively called "regulations", for simplicity. Similar to simple events, nested events conform to the syntactic patterns shown in TABLE 1.

REACH also recognizes mentions of "activations", i.e., higher-level interactions that describe the direct control of an entity's activity, e.g., "A activates B", where A and B are proteins. These are structurally very similar to regulations with the exception that the "controlled" participant is an implied downstream activity of a physical entity. These are not supported in BioPAX by design due to the inherent semantic ambiguity—proteins can have multiple, overlapping "activities". REACH supports them because they are abstractions frequently used to summarize the result of a sequence of steps in a signaling pathway. These activations are not as useful as regulations when considered in isolation, but they provide valuable information, including the author's high-level interpretation of the discussed mechanism, and indirect dependencies between proteins.

Complex Natural Language Phenomena

In addition to the event and entity extraction grammars, REACH also recognizes complex phenomena that are difficult to detect with rules alone, namely polarity and coreference.

Polarity: Special treatment is needed for statements that involve nested controls with different polarities. For example, in the text: "decreased PTPN13 expression enhances EphrinB1 phosphorylation", the predicate "enhances" seems to indicate that PTPN13 upregulates the phosphorylation of EphrinB1. But, a careful inspection of the context indicates that it is the "decrease" of PTPN13 that enhances the phosphorylation. This is interpreted by REACH as a polarity flip for the regulation of the phosphorylation (from positive to negative).

REACH handles polarity correction by traversing the syntactic dependency path that connects the trigger of the corresponding event and all its arguments in the syntactic dependency graph, keeping track of polarity-reversal words. Adjectival modifiers that connect to the path at any point are also considered. For example, the adjectival modifier "decreased" signals the polarity reversal.

Coreference resolution: Coreference, i.e., the ability for different mentions in text to refer to the same real world entity or event, is common in the biomedical domain. Resolving these coreference links leads to greater recall in information extraction, but it is rarely pursued in the biomedical domain. Coreference applies to both entities and events, and often reaches across sentence boundaries, as in the following examples, in which the bold text refers back to the italicized text. The correct coreference resolution in each case allows a further event to be extracted.

Influence Graph Search Engine

Figure 7:
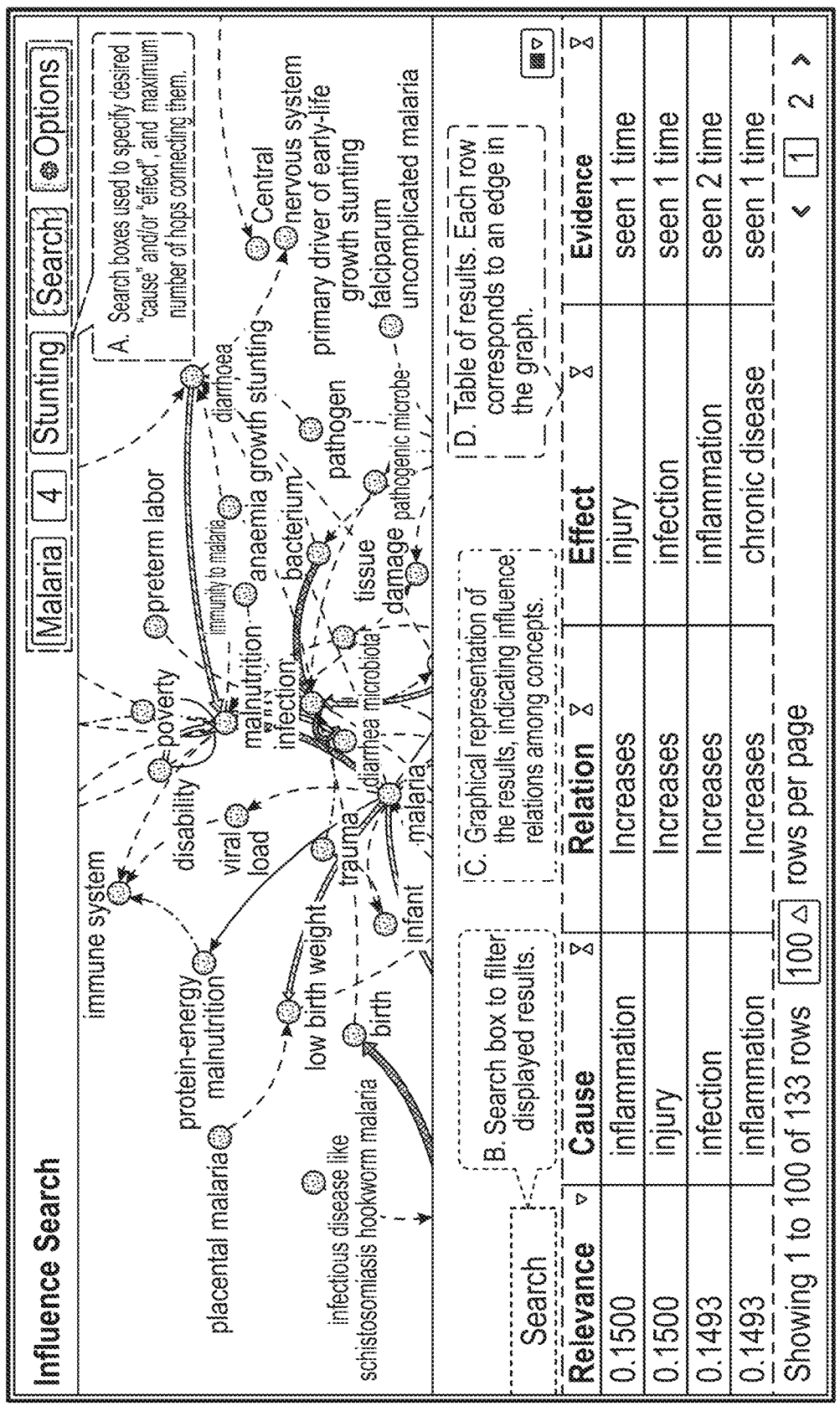
FIG. 7 shows a non-limiting example of a search engine UI for the conceptual influence graph. A: search boxes used to specify the purported CAUSE and/or EFFECT, and the maximum number of intervening edges that connect these concepts. B: search box used to further filter query results. C: network representation of the query results, displaying how the concepts influence each other. Green edges indicate promotion; red ones indicate inhibition. The width of a link is proportional to the amount of evidence supporting it. D: results as a table in which each row corresponds to an edge in the graph shown in C. The provenance (textual mentions) of an edge can be viewed by clicking on the "seen X times" entry corresponding to that row.

Conventional visualization of any sufficiently complex network suffers from the "hairball" problem. Referring to FIG. 7, to mitigate this obfuscation, a search user interface (UI) is introduced that allows for structured queries where a user can explore the influence neighborhood around a CAUSE and/or EFFECT to a configurable distance in terms of "hops" in the graph. Alternatively, the user may choose to explore direct and indirect chains of influence linking a possible CAUSE and EFFECT pair.

As the pool of analyzed documents grows, possible connections may become so numerous that the results of a query could overwhelm a user. For this reason, query results are ranked using a relevance score designed to bring surprising findings to the attention of the user. In order to rank the results of extraction by an estimate of their relative novelty, each deduplicated edge is scored according to a relevance metric based on the inverse document frequency (IDF) of the lemmatized terms in its concept nodes. Several scores for each edge are provided, which differ by (a) whether or not the score incorporates all of the terms in the source and destination concepts or only their head lemmas, and (b) whether the score is an average or maximum. IDF scores were calculated for the lemma of each term in the vocabulary using the entire open access subset of PubMed. To simplify ranking, the scores were normalized using the maximum IDF possible for the dataset.

Model Construction

Figure 8A:
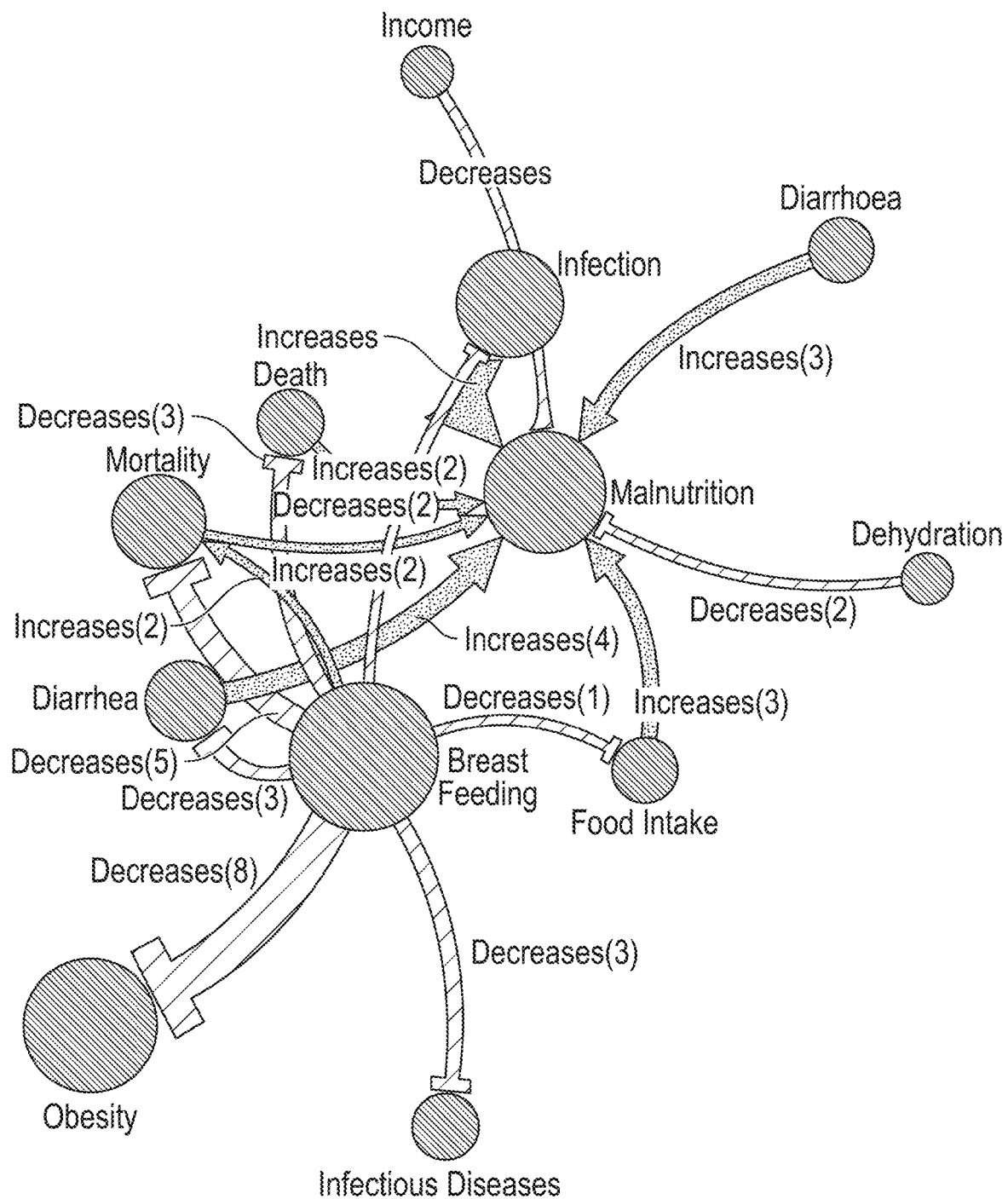
FIGS. 8A-8D show a non-limiting example of the influence search tool that allows users to alternate between searching and model construction.

The influence search tool allows users to alternate between searching and model construction. Referring to FIGS. 8A-8D, consider the following workflow:

1. The user searches for indirect influence connections between "breastfeeding" and "malnutrition" (FIG. 8A).

Figure 8B:
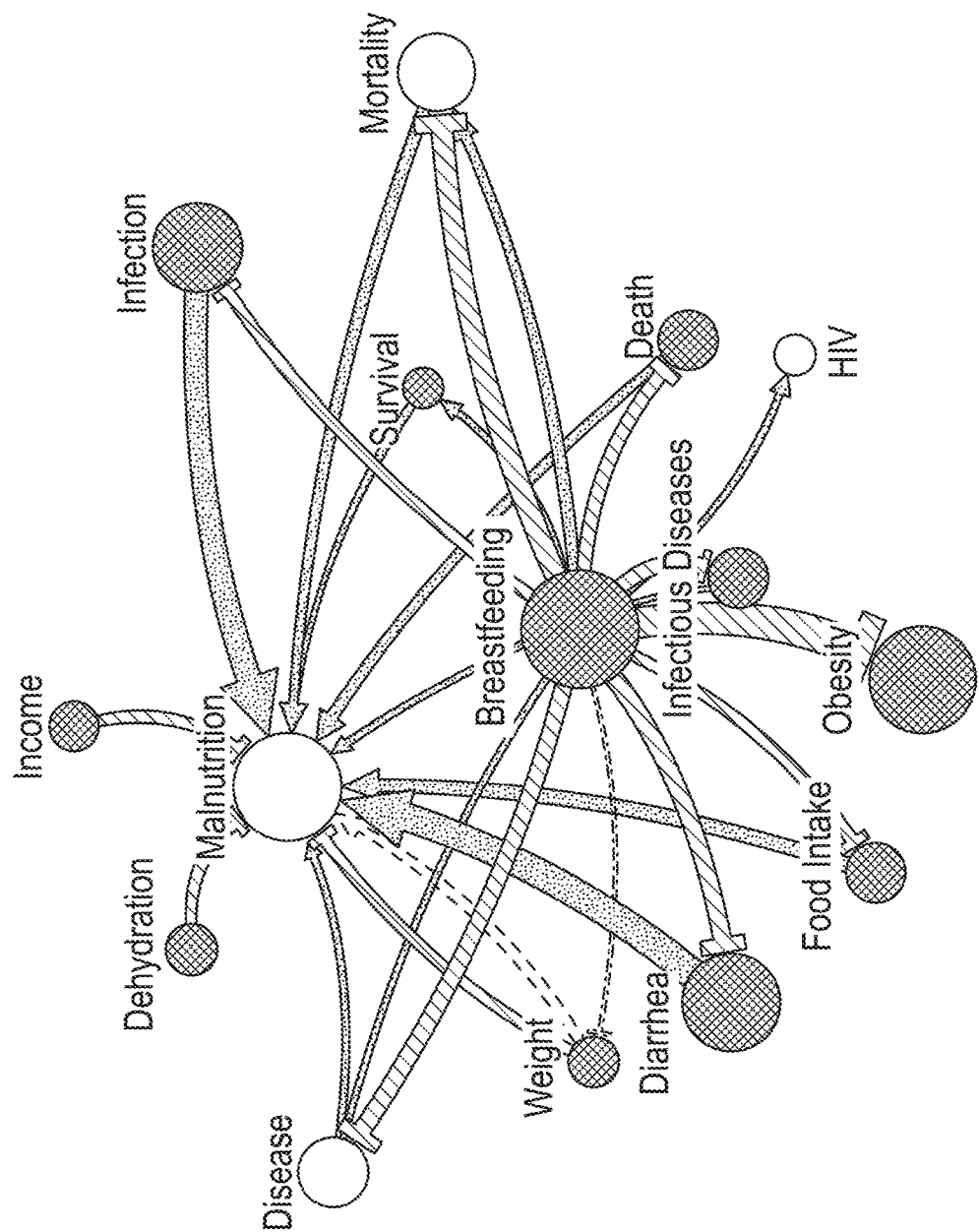

2. These results are imported in the model construction workspace (FIG. 8B).

Figure 8C:
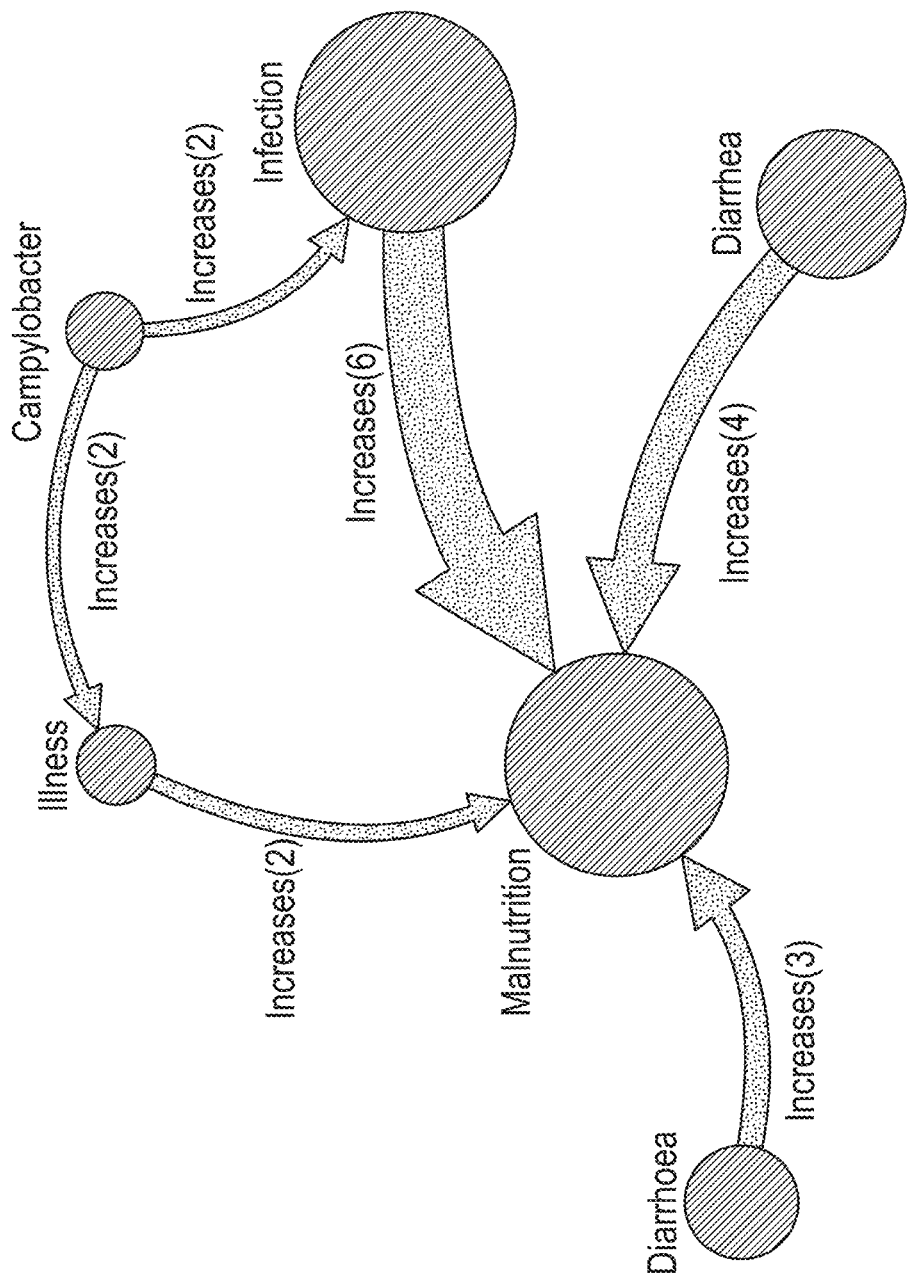

3. The user searches for indirect influence connections between "campylobacter" and "malnutrition" (FIG. 8C).

Figure 8D:
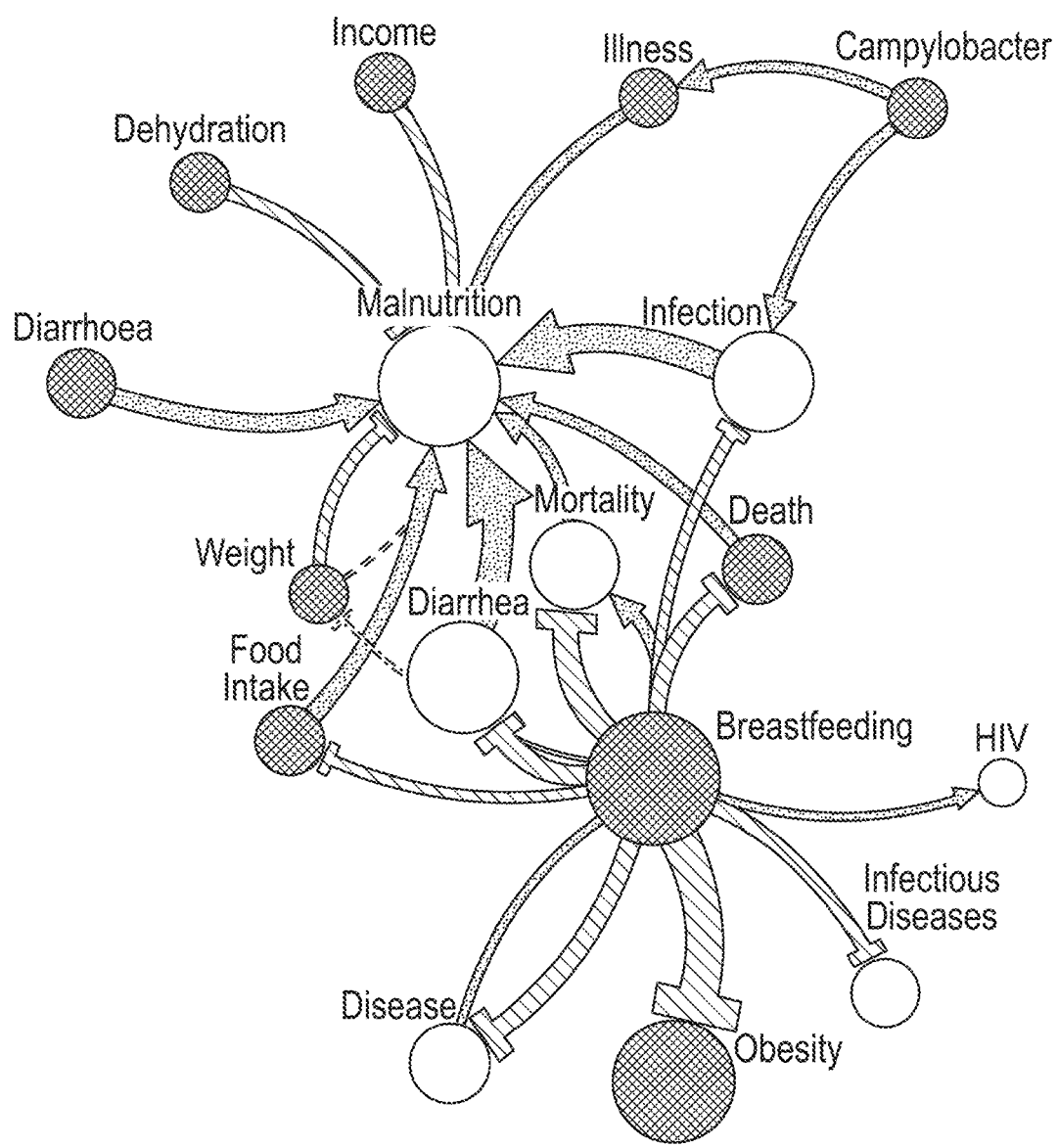

4. The user imports these new results in the model construction workspace (FIG. 8D).

The resulting model is a persistent aggregation of results from multiple searches. The user has full control of this model graph which merged several models, and can add/remove/edit both nodes and edges connecting them.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control device (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads; In addition, those of ordinary skill in the related field will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.: a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

The following is another non-limiting example of the present invention. Said example is not intended to limit the invention in any way, equivalents or substitutes are within the scope of the invention.

In a nutshell, our proposed approach for rule generation uses enumerative search that is guided by a transformer-based scoring mechanism, and is optimized using search-space pruning heuristics. This method of rule generation/synthesis serves to establish a plurality of grammar rules to be used for converting a literature into a directed graph of terms through entity and event extraction, as described earlier in this application. Our transformer model scores each potential next state, given the current state, such that the number of states to be explored is minimized. Specifically, our system consists of two main components. The first of the main components may be a searcher, with Branch and Bound (Land and Doig, 1960) as the underlying algorithm. The searcher uses the scores assigned by the scorer (below) to determine the order of exploration, choosing the state with the highest score, regardless of its position in the search tree. As such, it is important for the scorer to assign high scores to states that are in the subtree that leads to the desired final rule, and lower scores to all other states. The second of the main components may be a scorer, with a transformer backbone that is initialized with a pretrained model, but fine-tuned through self-supervision, i.e., over automatically generated rules. The scorer uses the current state and the specification to score each potential next state. Intuitively, this transformer can be considered akin to a language model (LM) for rules similar to a LM, where it is trained to predict the next likely element (here, a component in a rule rather than a word in a sentence), and it is self-supervised.

The searcher is responsible for exploring the states in priority order (as determined b the scorer), and deciding whether or not a given state is successful (i.e., it is a valid query and it correctly extracts the requested highlighted words and nothing more). The search space can be interpreted as a tree, where the root is the initial candidate solution and the children of a node n are the candidate solutions that the node n could expand to. Given this, the searcher can be seen as iteratively applying a sequence of three operations: (a) Expand the current state according to the DSL grammar, (b) Score each expanded candidate next state and insert them into the priority queue, and (c) Select from the queue the state with the highest score to be the next state. We repeat this process until we either find a solution or we reach a maximum number of steps.

Figure 9:
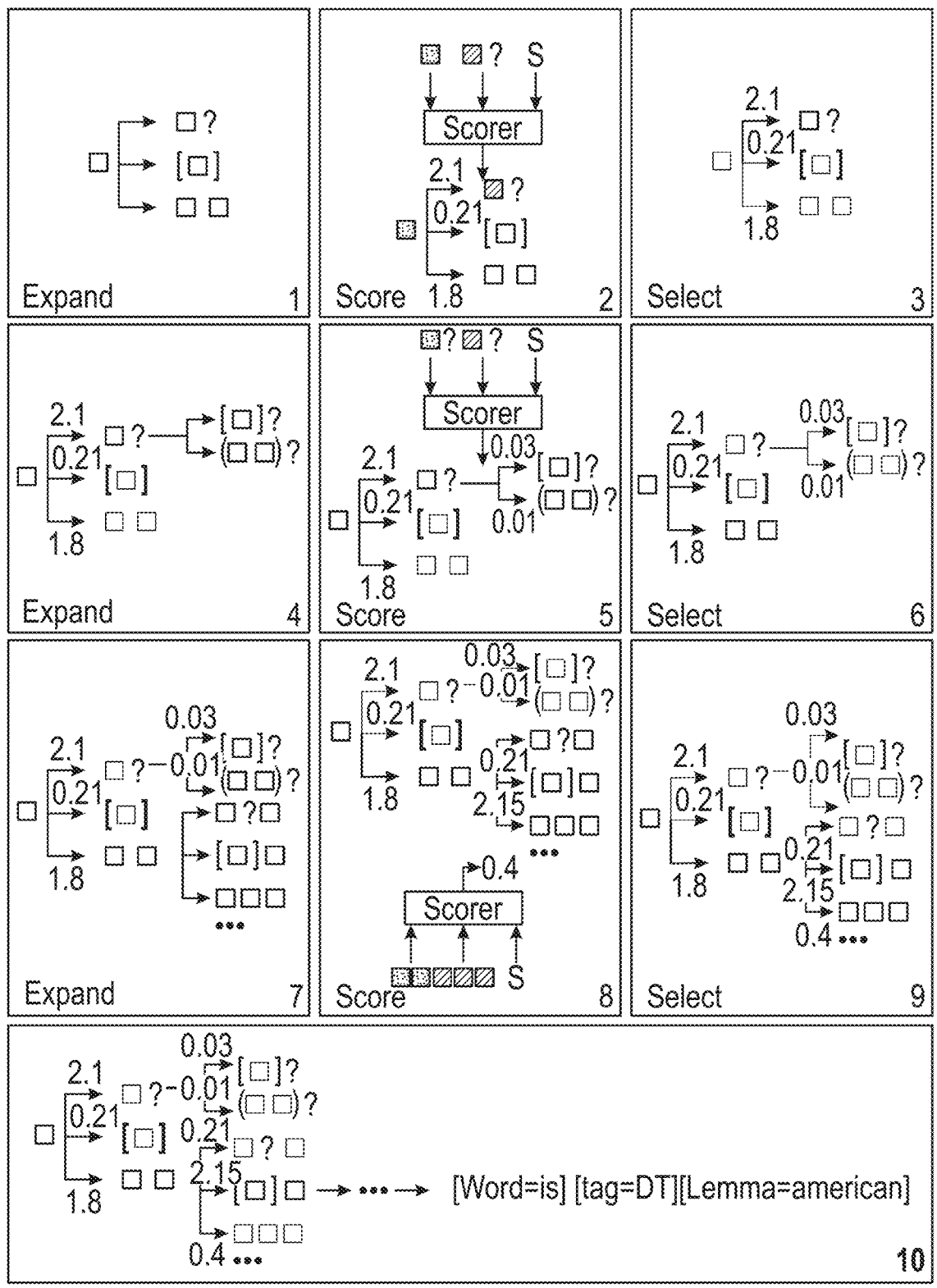
FIG. 9 shows an example of the algorithm of the presently claimed invention of the proposed rule synthesis algorithm of the presently claimed invention. Conceptually, the algorithm consists of three main steps: expand the current state, score the possible next states, and select the state with the highest score. In the beginning, we start from the placeholder (□) and expand it (1). We score each expansion (2) and transition to the one with the highest score (3), We then expand and score again (4, 5). At this point, notice that the state with the highest score is □□, which is in a different subtree than the current state (□?). The enumerative searcher, with Branch & Bound as the underlying algorithm, transitions to the state with the highest score, regardless of the current state position (6). This process repeats (7-9) until we arrive at a state that is a valid rule (last block), or we reach a maximum number of steps and stop. The output of this rule synthesis algorithm is a plurality of rules that can be used to convert a piece of literature of a given field of study into a directed graph.
Figure 10:
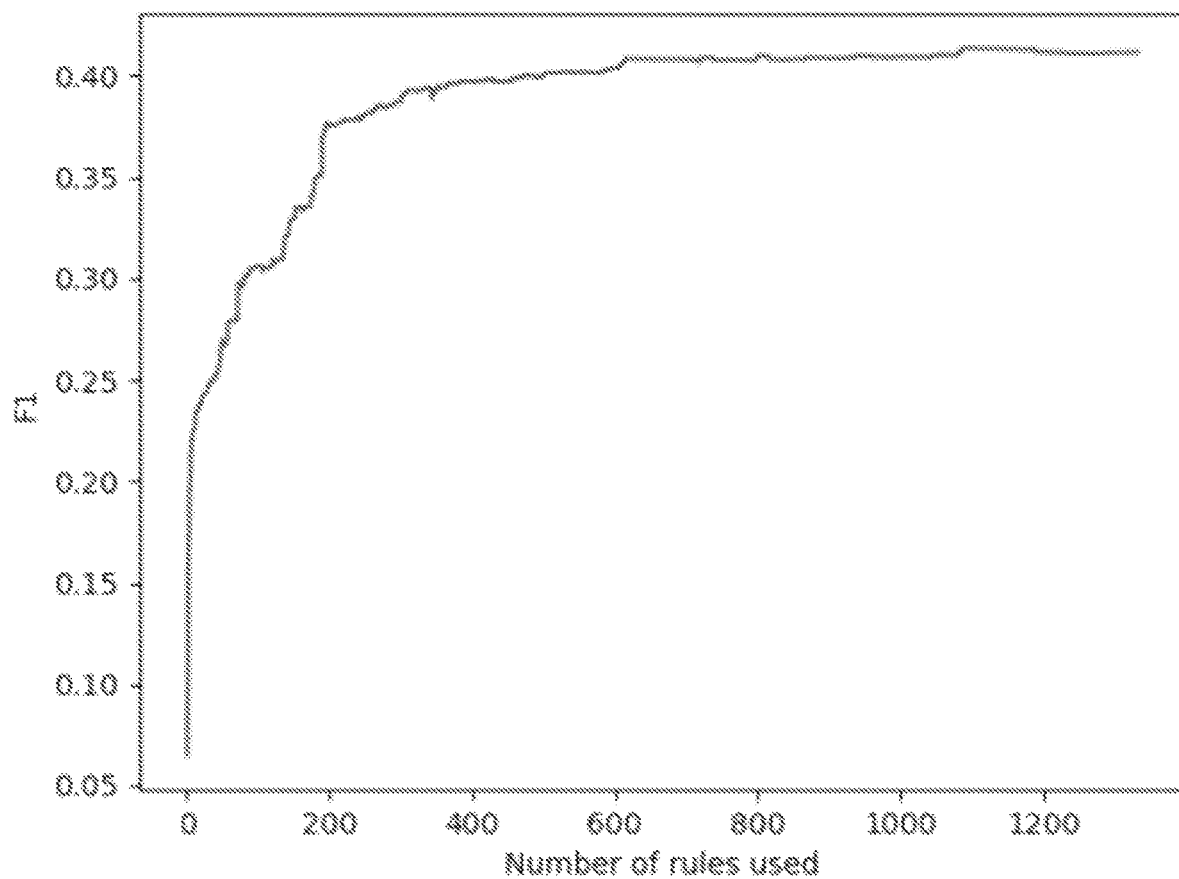
FIG. 10 shows a graph of performance contribution of each rule. Rules with more sentences in their specifications are added first.

Referring now to FIG. 9, an example is the input sentence She is an American actress and singer, with is an American as the highlighted span or selection. Initially, the current state is □, our start symbol, which is a blank square. We expand □ (cell 1) to possible next states, which for simplicity we will consider to be □? (optional), [□] (constraint), or □□ (concatenation). We then score each possible next state with the scorer (cell 2) and select the state with the highest score, □? (cell 3). Similarly, we then expand □? into possible next states (cell 4) and score each (cell 5). Notice that now the state with the highest score is □□, with a score of 1.8, which is in a different subtree than our current state, □?. Nevertheless, we select □□, because it has the highest score among all possible next states (cell 6). If there are several holes, we always expand the left-most. This capability makes the branch and bound algorithm a good compromise between depth-first and breadth-first search, allowing us to backtrack. Since a depth-first search would have chosen the state with the highest score among the current state's expansions, it is susceptible to getting trapped in subtrees that initially look promising, but that do not contain a solution. In a breadth-first search we would explore level-by-level, which is prohibitive for trees that grow exponentially. We then continue to expand-score-select (cells 7-8-9), stopping when we find a solution (last cell), or we reach a maximum number of steps. In this example, we arrive at one of the possible solutions for the example, [word=is] [tag=DT] [lemma=american].

While the scorer determines the order of exploration, this is complemented by techniques for greatly pruning the search space to reduce the number of nodes that need to be considered. In particular, adapting the techniques of Lee et al. (2016) to our use case, we prune states for which the least restrictive rule that could result from this state cannot completely match the highlighted specification, as nothing created from that subtree can be a solution. For example, consider the state [word=is] [tag=NN]☐. The least restrictive rule resulting from this state would be one which matches the word is, followed by a noun, and then followed by 0 or more (unrestricted) tokens. If such a rule cannot completely match the highlighted tokens, then a valid solution cannot be found in that subtree so we prune the branch.

The Scorer is responsible for assigning a numerical value to a state to establish the order of exploration. We explore two variants of scorer: a static variant based on the components of a given state, and a contextual variant based on a self-supervised model that takes the current context into account.

In the static approach, the score of a state is solely determined by its components. The cost of each state is constructed by summing the cost of its components with the cost of its node. For example, the cost of ☐☐ (concatenation) is: cost(☐☐)=cost(☐)+cost(☐)+cost(concatenation). The costs for each operation were hand-tuned based on intuition (e.g., exploring negation takes a very long time as you need to consider everything some constraints cannot be, thus negation is given a higher cost), then optimized on a small external development set of sentences and specifications. In addition to the hand-tuned nature of the static scorer, there are two main limitations. First, the static weights mean that a given state will always receive the same score regardless of the sentence context or the previous state. Second, states with more components in their underlying pattern inherently have a higher cost because the score is derived by adding the cost of the components to the cost of the operation. This is undesirable, as the score of a state which expands to a solution should be higher than that of a state which does not, regardless of their length.

To supplement the score from the static weights, we introduce an additional score that estimates how well a current (incomplete) rule matches the specification so far. For this, we remove all components of an incomplete rule that contain a placeholder and apply the remainder of the rule to the specification. We then boost the state's score for each specification token that is correctly matched, and penalize for each token incorrectly matched. For example, for a rule such as [word=☐] [tag=DT] [lemma=american], we remove incomplete components, resulting in the rule: [tag=DT] [lemma=american]. We then match the new rule against the specification, and for each highlighted token matched, the function adds 1 to the score. For matches outside the highlight, the function adds −1. This score is returned and used to augment the score given by the static scorer. We observe that using this score augmentation favors more concrete constraints, such as [word=an], which help ground the rule to more lexical artifacts, but may hinder generalization.

To address the above two limitations of the static weights, we propose a contextual scorer that utilizes the current context (i.e., the specification and the current state), to determine the cost of a candidate next state. Unlike with our score augmentation, here we make use of the full specification, not just what is matched at a given time. For this scorer, we use a transformer-based encoder to score each (current state, next potential state, specification) input. Intuitively, this score is the likelihood that the next potential state is better than the current state, which allows the scores to be comparable across all levels in the search tree. Our contextualized scorer consists of a variant of BERT (Devlin et al., 2018; Turc et al., 2019) with a linear layer on top. The input to the BERT encoder is a concatenation of: (1) a linearization of the AST of the current state (e.g., ☐), (2) the linearized AST of the next potential state (☐?), (3) and the (sentence, selection) specification. Importantly, since these concatenated components are fundamentally different, we differentiate between them by using different token type ids in the encoder. For example, the tokens associated with the current state have a token type id of 1 and the tokens of the next potential state have 2. We further differentiate between the highlighted and non-highlighted portions of the specification text in the same way, with token type ids 3 and 4, respectively. So far we have used only a single sentence in our specification examples. Nevertheless, our system can handle multiple sentences and their highlights. We require the enumerative searcher to find a rule that would satisfy all the constraints for all sentences in the specification. When scoring, we score a (current state, next potential state, single-sentence specification) triple, and then average over all sentences in the specification to obtain a final score for the (current state, next potential state) transition.

Unlike the static scorer, the neural guiding function of the contextual scorer needs to be trained, which we do with self-supervision. Because there is no large corpus of Odinson rules, we artificially generate one with random spans of text that we randomly manipulate into rules. Our random-length text spans are chosen from the UMBC corpus (Han et al., 2013). Each token in this span is then randomly manipulated into an Odinson token constraint based on either word, lemma, or part-of-speech. For example, a span such as the dog barked might be converted to [tag=DT] [word=dog] [lemma=bark]. Then, to expose the model to additional rule components (e.g., alternation, quantifiers), we add further manipulations, again with randomization. To add alternations, we build a temporary query by replacing one of the token constraints with a wildcard that can match any token and query the corpus for an additional sentence that has different content in that position. This new content is added as an alternation. For example, with the temporary version of the above query [tag=DT] [word=dog] [ ], we might find A dog runs, resulting in the following alternation: [tag=DT] [word=dog] ([lemma=bark]|[lemma=run]), To add a quantifier (e.g., *, +, or ?), we select a token to modify and a quantifier to add, and check the corpus to ensure that the addition of the quantifier yields additional results. After generating each random rule, we build a corresponding specification by querying the UMBC corpus: the retrieved sentences and their matched spans constitute the (sentence, selection) pairs of the specification. However, having a specification and the corresponding rule is not enough to train our model. We also need the correct sequence of transitions from the initial placeholder to the final rule. For this, we use an Oracle to generate the shortest sequence of transitions, which we consider to be the correct sequence. This sequence of transitions, together with the specification, forms the training data for our model. Note that we train only on this data, i.e., after this self-supervised training process the transformer's weights are fixed. We train using the cross-entropy loss and with a cyclical learning rate, as suggested by (Smith, 2017). Further, we employ a curriculum learning approach (Bengio et al., 2009; Platanios et al., 2019), splitting the training data by sentence length and by pattern length. We did not tune our hyperparameters.

We evaluate our system both intrinsically and extrinsically. The intrinsic evaluation is to determine whether or not the contextualized model reduces the number of search steps needed to find a valid rule. The extrinsic evaluation applies our rule synthesis approach to an information extraction task. For both evaluations, to determine rule success, we generate an in-memory Odinson index of the sentences in the specification, apply the rule, and compare its extractions to the specification selection(s).

Ideally, we would like to evaluate our rule synthesis approach as it is intended to be deployed with users providing specifications, and on large-scale information extraction projects. However, that is beyond the scope of the current, initial effort. Therefore, we instead approximate a user with a preexisting information extraction dataset: TACRED (Zhang et al., 2017), a relation extraction (RE) dataset with 42 possible labels. To simulate a human user, we build specifications from the TACRED training data. For a given sentence in the dataset, we consider the words between the two provided entities to be the highlighted words (if there is no relation, then there is no highlight). In this approach, we could potentially generate a single rule for each sentence in the training data, but this would result in many overly-specific rules that do not generalize well. On the other hand, we could treat all sentences corresponding to a particular label as a single specification. However, this would ignore the differences in the underlying syntactic constructions (e.g., trying to find a single rule for both active and passive voice, etc.). Instead we choose a compromise. We first group the training data based on relation labels, then cluster the instances in each group to form our specifications. Specifically, we represent each sentence in a group as the average GloVe embedding (Pennington et al., 2014) of the words between the entities, and then perform hierarchical agglomerative clustering based on cosine distance (Virtanen et al., 2020; Pedregosa et al., 2011). We stop the process when either the cluster is small enough (less than 10 in our approach), or we reach a maximum number of trials. With this approach, from a total of 68,124 training sentences, we obtain approximately 3900 clusters. The minimum number of sentences is 1, and the maximum number of sentences is 1020, with the average of 3.29 and the median of 2. Again, we do not train or tune our contextualized scorer on this data. Instead we use these clusters as our simulated humans: we create one specification from each of these clusters, and use our pretrained rule synthesis method to generate a rule for each specification. If the synthesis succeeds, that rule is associated with the corresponding relation. Since there are several of these specifications for each relation, and thus several rules, at testing time, we apply each rule to each test sentence and keep track of whether or not it matches. After applying all rules, for each sentence, we return the relation with the highest count of matches, or no relation if none of our rules matched. In case of ties, we return the first.

While our intent is to simulate a human user, the differences between our proxy and what would be provided by an actual user necessitate some additional steps. To account for the fact that there is large variation in cluster (and thus specification) size, we weight each resulting rule based on the log of the number of sentences in the specification. Intuitively, a rule generated for a cluster with many sentences has a greater chance to generalize than a rule generated for a cluster with a single sentence. Further, prior to applying the synthesized rules to the test data, we concatenate the corresponding entity types to the rule. For example, for a rule such as [tag=NN] [word=speaker], synthesized from a cluster with the first entity being nationality and the second entity being person, we will apply on the test data the following rule [word=nationality] [tag=NN] [word=speaker] [word=person]. For clusters without any highlighted words (i.e., where all entities are adjacent), the pattern will consist of only a concatenation of the entity types. Finally, we do not use the scorer for the trivial case where there is only one highlighted word. Instead, we return a sequence of OR constraints.

For the intrinsic evaluation, we compare how quickly a valid rule can be found when the search is guided by our contextualized scorer versus the static scorers. This is measured on a held-out portion of our randomly generated dataset as well as on the cluster-based specifications from the training partition of TACRED. The transformer-based contextualized approach finds more solutions in fewer steps on both datasets. This demonstrates that the scores obtained from the contextualized scorer are helpful for guiding the exploration of the rule search space.

To evaluate our approach extrinsically, we want to know how well it performs on an information extraction task. For this, we simulate a human user with the TACRED dataset, and compare our rule synthesis approach with two baselines and several supervised approaches from previous work.

Our first baseline is a traditional seq2seq model with transformers (Sutskever et al., 2014; Vaswani et al., 2017; Devlin et al., 2018) that has access to the same data as our approach, and operates under the same setting, i.e., pretrain using self-supervision, and then generate rules using specifications from the TACRED training partition. Here, however, the training task is to generate the final rule from the specification. While it is possible to design constraints on the decoder that prevent it from generating invalid rules (Wang et al., 2018a), it is non-trivial and beyond the scope of the work here. In comparison, our rule synthesis method does not suffer from this problem, as it generates only valid rules by design. Our second baseline (Patterns) is a rule-based system that uses all the hand-made rules compiled for TACRED by Zhang et al. (2017). Our third baseline (No Learning) consists of directly returning a rule for trivial cases, such as when there are no highlighted words and when there is only one highlighted word. When there is no highlighted word, the final rule is empty. When there is one word, the final rule is either a word, lemma or tag constraint, depending on which will result in a shorter rule.

We also compare our approach with the current, supervised state of the art (SOA) for models that do not supplement TACRED with additional data: Joshi et al. (2020): A transformer-based, relation classifier using Span-BERT, which was pretrained with a span-based masking; Zhou and Chen (2021): A transformer-based relation classifier that utilizes an explicit marker for entity type; and Cohen et al. (2020): A reduction of the relation classification task into span prediction, with a transformer-based architecture.

We note that both variants of our scorer (static and dynamic) perform better than the seq2seq and no-scorer baselines (34 F1 vs 28 F1). The rules hand-crafted for TACRED have higher precision (as would be expected), but our contextualized scorer obtains higher recall and, overall, a higher F1 score (41.4 F1 vs 36.6 F1). When comparing our contextualized-scoring approach to the supervised baselines, we note that while we do not match their performance, there are two important factors to consider. First, our proposed approach is trained on domain agnostic data that we automatically generated, and then applied on TACRED as is, without fine-tuning. On the other hand, the supervised approaches that we compare with train/fine-tune on the TACRED splits. Second, the output of our approach is a set of human-interpretable rules, while the output of the other approaches is a statistical model that produces only the final label. In other words, previous work is much more opaque and thus more difficult to interpret, debug, adjust, maintain, and protect from hidden biases present in the training data (e.g., Kurita et al., 2019; Sheng et al., 2019).

We use clusters of the TACRED training data as proxies for human-provided specifications, which resulted in thousands of rules (one rule per cluster). It is unrealistic to assume a human user would be willing to produce that many specifications. Thus, to explore how many specifications (and, accordingly, how many rules) are needed, we sorted the rules in descending order of the size of their corresponding specifications and then included them one-by-one. Note that we need less than 25% of the rules to retain over 95% of full performance, suggesting that the approach is indeed feasible for a real use case. How does the size of the transformer backbone affect performance? When we compare the performance differences of the different transformer backbones, we note that increasing the size of the transformer does not necessarily produce better performance. In fact, of the variants we used, we obtained our highest performance with BERT-Mini. This is helpful, as smaller models can be run faster and with less computational overhead.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method for converting literature of a given field of study into a directed graph, wherein the given field of study has a lexicon comprising a plurality of terms and a plurality of functions operating on, executed by, or descriptive of said terms, wherein each term comprises one or more words, wherein the terms are nodes of the directed graph, wherein lines connecting terms in the graph are functions and have a direction, wherein the method comprises:

a) constructing a plurality of rules, wherein the rules comprise:
  i) a trigger comprising a specified word, sequence of specified words or sequence of specified part of speech attributes; and
  ii) a plurality of arguments, which describe a pattern, wherein the pattern has one of two forms:
     A) a surface pattern, comprising a particular sequence of at least one words and parts of speech, wherein the surface pattern matches any sequence of words which has the specified words and parts of speech in the specified order, wherein the surface pattern can also be the trigger; or
     B) a syntactic dependency pattern, hereinafter referred to as a syntactic pattern, wherein the syntactic pattern describes a graph structure of a sentence, wherein the graph structure has nodes and edges corresponding to parts of speech, wherein each part of speech comprises at least one word, wherein the syntactic pattern comprises an arrangement of nodes and edges in the graph structure which specify a particular syntactic structure, wherein the plurality of arguments further specify constraints on the words and attributes of words which can match the syntactic pattern, wherein, as a result, only a sentence with the specified syntactic structure and with only allowed words in the specified nodes and edges of the structure will match the syntactic pattern;
  wherein the pattern comprises a head and a dependent, wherein the head comprises an agent, cause, or subject in a sentence, wherein the dependent comprises a patient, effect, or object in the sentence, wherein an argument of the rule can specify a nested pattern as part of the pattern, wherein a rule with the nested pattern is a nested event rule, wherein a rule with no nested patterns is a simple event rule;
b) pre-processing the literature to produce an annotated document, comprising segmenting the literature into a plurality of sentences by detecting a plurality of word boundaries and a plurality of sentence boundaries within the literature, assigning a part-of-speech ("POS") tag to each word within each sentence according to the part of speech describing the word, and identifying a syntactical relation between each word in each sentence according to the POS tag of each word;
c) extracting a plurality of simple events from the annotated document using the plurality of rules, wherein an event is a particular occurrence in the literature of a sequence of words matching one of the plurality of simple event rules, wherein at least two terms and a function are extracted from the event, wherein the terms and the function are words which are labeled with the parts of speech which match the pattern of the rule, wherein one of the terms matches the head, and one of the terms matches the dependent of the pattern, wherein the at least two terms and function are added to the directed graph, wherein the terms are nodes and the function is a link between the nodes, wherein the direction of the graph line is from the term which is the head to the term which is the dependent;
d) iteratively repeating step (d) to extract nested events from the annotated document until no more events are identified, wherein a nested event is a particular occurrence in the literature of a sequence of words matching one of the plurality of nested event rules, wherein the dependent of the rule has been previously identified as an event, wherein at least one term and a function, are extracted from the nested event, wherein the terms and the function are words which are labeled with the parts of speech which match the pattern, wherein one of the terms matches the head, and the event matches the dependent of the syntactic pattern, wherein the terms, function, and event are added to the directed graph, wherein the terms are nodes and the function is the link between the nodes, wherein the direction of the graph line is from the term which is the head to the event which is the dependent;

e) distinguishing, via annotation, a polarity for each event identified in the literature, wherein the polarity comprises a negation or non-negation of the event, wherein determination of polarity is based on analyzing the sentence from which the event was extracted and determining whether the sentence contains the negation in relation to the event, where the annotation is applied to the link between the nodes of the event in the directed graph; and f) distinguishing, via annotation, each event identified by the literature as speculative from each factual event, wherein determination of speculation is based on analyzing the sentence from which the simple or nested event was extracted, and determining whether the set of words denote speculation with respect to the event, where the annotation is applied to a line link between the nodes of the event in the directed graph;

wherein the directed graph is thus produced as each term and each function in the literature is annotated, wherein the directed graph is searchable, as a query can be matched with one or more terms, one or more functions, or a combination thereof.

2. The method of claim 1, wherein extracting the events comprises:

a) searching annotated text for triggers which are defined in the plurality of rules;

b) upon detecting the trigger of the rule, determining if the pattern defined by the rule matches the sequence of words or syntactic structure of a current sentence in the annotated text, wherein the current sentence is the sentence which contains the trigger;

c) if the current sentence matches the pattern defined by the rule, extracting the specific words or groups of words corresponding to the parts of speech identified by the pattern;

d) identifying the words or groups of words which are terms, the words or groups of words which are functions, and the words or groups of words which match existing events in the directed graph, if any;

e) identifying the terms or events corresponding to the head and the dependent of the pattern;

f) adding the terms of the event to the directed graph as nodes, wherein if a particular term is already represented in the graph, the number of mentions of the terms is accumulated via annotation; and g) adding a link between the terms denoted by the function, wherein the direction of the link is from the head term to the dependent term or event, wherein if the link is already present in the graph, the number of mentions of the event is accumulated via annotation on the link.

3. The method of claim 1, further comprising performing named-entity recognition ("NER") on the annotated document to annotate mentions of the plurality of terms, wherein each mention of a term comprises one or more words; and grounding each mention of the term by linking said mention to a corresponding entry in one or more external databases, wherein a unique identifier is generated and assigned to each mention of the term that has no corresponding entry in the one or more external databases.

4. The method of claim 3, further comprising repeating performing named entity recognition on the annotated document to annotate mentions of nested entities, wherein a nested entity comprises the term which comprises a plurality of words, wherein a subset of one or more of the plurality of words matches a previously recognized named entity.

5. The method of claim 3, wherein the method further comprises searching for alternate words or groups of words used to refer to the same term, wherein if the part of speech of the syntactic pattern matches a common noun, a search is performed to identify a word or group of words representing a named entity in nearby text, wherein the search determines if the common noun refers to the named entity, wherein the event is linked to the node representing the named entity in the directed graph.

6. The method of claim 1, further comprising assigning a polarity to the nested event contained within the event, wherein the event has a first polarity and the nested event has a second nominal polarity, wherein the nested event is assigned a combined polarity, wherein a positive and a negative polarity combine to form a negative polarity, wherein a negative and a negative polarity combine to form a positive polarity, wherein a positive and a positive polarity combine to form a positive polarity, wherein the combined polarity is assigned to the nested event via annotation.

7. The method of claim 1, further comprising assigning a utility to the event, wherein the utility is a function of the number of mentions of the event, the polarities of the mentions, and the speculation annotations of the mentions.

8. The method of claim 1, wherein the syntactic pattern comprise a declarative syntactic pattern, a passive syntactic pattern, a prepositional nominalization, a subject relative clause with optional apposition, a subject apposition syntactic pattern, or an object apposition paraphrastic causative individually or in combination.

9. A system (200) for providing a searchable, structured data set by converting literature of a given field of study into a directed graph, wherein the given field of study has a lexicon comprising a plurality of terms and a plurality of functions operating on, executed by, or descriptive of said terms, the system (200) comprising:

a) a web-based user interface (202) comprising:
  i) a selection field providing a list of literature from which a user may select;
  ii) a first input field enabling a user to optionally input text to serve as the literature; and
  iii) a second input field accepting a query from a user;

b) a remote server (204), operatively coupled to the web-based user interface, comprising:

c) a database (208) storing a predefined domain grammar, wherein the pre-defined domain grammar is an algorithm comprising a plurality of rules for converting selected literature to produce the directed graph, wherein conversion of said literature into the directed graph comprises annotating the plurality of terms and the plurality of functions, wherein each rule comprises:
  i) a trigger, wherein the trigger is a specified word, sequence of specified words or sequence of specified part of speech attributes; and ii) a plurality of arguments, which describe a pattern, wherein the pattern has one of two forms:
  A) a surface pattern, comprising a particular sequence of at least one words and parts of speech, wherein the surface pattern matches any sequence of words which has the specified words and parts of speech in the specified order, wherein the surface pattern may also be the trigger; or
  B) a syntactic dependency pattern, hereinafter referred to as a syntactic pattern, wherein the syntactic pattern describes a graph structure of a sentence, wherein the graph structure has nodes and edges corresponding to parts of speech, wherein each part of speech comprises at least one word, wherein the syntactic pattern comprises an arrangement of nodes and edges in the graph structure which specify a particular syntactic structure, wherein the plurality of arguments further specify constraints on the words and attributes of words which can match the pattern syntactic, wherein, as a result, only a sentence with the specified syntactic structure and with only allowed words in the specified nodes and edges of the structure will match the syntactic pattern;
  wherein the pattern comprises a head and a dependent, wherein the head comprises an agent, cause, or subject in a sentence; wherein the dependent comprises a patient, effect, or object in the sentence, wherein an argument of the rule can specify a nested pattern as part of the pattern, wherein a rule with the nested pattern is a nested event rule, wherein a rule with no nested patterns is a simple event rule;
d) a processor (206), operatively coupled to the database (208), and configured to execute the algorithm of the pre-defined domain grammar to perform operations comprising:
  i) pre-processing the literature to produce an annotated document, comprising segmenting the literature into a plurality of sentences by detecting a plurality of word boundaries and a plurality of sentence boundaries within the literature, assigning a part-of-speech ("POS") tag to each word within each sentence according to the part of speech describing the word, and identifying a syntactical relation between each word in each sentence according to the POS tag of each word;
  ii) extracting a plurality of simple events from the annotated document using the plurality of rules, wherein an event is a particular occurrence in the literature of a sequence of words matching one of the plurality of simple event rules, wherein at least two terms and a function are extracted from the event, wherein the terms and the function are words which are labeled with the parts of speech which match the pattern of the rule, wherein one of the terms matches the head, and one of the terms matches the dependent of the pattern, wherein the at least two terms and function are added to the directed graph, wherein the terms are nodes and the function is a link between the nodes, wherein a direction of the graph line is from the term which is the head to the term which is the dependent;
  iii) iteratively repeating step (ii) to extract the nested events from the annotated document until no more events are identified, wherein a nested event is a particular occurrence in the literature of a sequence of words matching one of the plurality of nested event rules, wherein the dependent of the rule has been previously identified as an event, wherein at least one term and a function, are extracted from the nested event, wherein the terms and the function are words which are labeled with the parts of speech which match the pattern, wherein one of the terms matches the head, and the event matches the dependent of the syntactic pattern, wherein the terms, function, and event are added to the directed graph, wherein the terms are nodes and the function is the link between the nodes, wherein the direction of the graph line is from the term which is the head to the event which is the dependent;
  iv) distinguishing, via annotation, a polarity for each event identified in the literature, wherein the polarity comprises a negation or non-negation of the event, wherein determination of polarity is based on analyzing the sentence from which the event was extracted and determining whether the sentence contains the negation in relation to the event, where the annotation is applied to the link between the nodes of the event in the directed graph; and
  v) distinguishing, via annotation, each event identified by the literature as speculative from each factual event, wherein determination of speculation is based on analyzing the sentence from which the simple or nested event was extracted, and determining whether the set of words denote speculation with respect to the event, where the annotation is applied to a line link between the nodes of the event in the directed graph;
    wherein the directed graph is thus produced as each term and each function in the literature is annotated, wherein the directed graph is searchable, as a query can be matched with one or more terms, one or more functions, or a combination thereof,
    wherein a visualization of the directed graph is generated, which can be optionally displayed to the user via the web-based user interface, wherein the second input field accepts the query and produces a search result by matching the query to one or more terms or one or more functions in the directed graph.

10. The system of claim 9, wherein extracting the events comprises:
a) searching annotated text for triggers which are defined in the plurality of rules;
b) upon detecting the trigger of the rule, determining if the pattern defined by the rule matches the sequence of words or syntactic structure of a current sentence in the annotated text, wherein the current sentence is the sentence which contains the trigger;
c) if the current sentence matches the pattern defined by the rule, extracting the specific words or groups of words corresponding to the parts of speech identified by the pattern;
d) identifying the words or groups of words which are terms, the words or groups of words which are functions, and the words or groups of words which match existing events in the directed graph, if any;
e) identifying the terms or events corresponding to the head and the dependent of the pattern;
f) adding the terms of the event to the directed graph as nodes, wherein if a particular term is already represented in the graph, the number of mentions of the terms is accumulated via annotation; and g) adding a link between the terms denoted by the function, wherein the direction of the link is from the head term to the dependent term or event, wherein if the link is already present in the graph, the number of mentions of the event is accumulated via annotation on the link.

11. The system of claim 9, wherein the operations performed by the processor (206) further comprises:
a) performing named-entity recognition ("NER") on the annotated document to annotate mentions of the plurality of terms, wherein each mention of a term comprises one or more words;
b) grounding each mention of the term by linking said mention to a corresponding entry in one or more external databases, wherein a unique identifier is generated and assigned to each mention of the term that has no corresponding entry in the one or more external databases; and
c) performing NER on the annotated document to annotate mentions of nested entities, wherein a nested entity comprises the term which comprises a plurality of words, wherein a subset of one or more of the plurality of words matches a previously recognized named entity.

12. The system of claim 11, wherein the operations performed by the processor (206) further comprises searching for alternate words or groups of words used to refer to the same term, wherein if the part of speech of the syntactic pattern matches a common noun, a search is performed to identify a word or group of words representing a named entity in nearby text, wherein the search determines if the common noun refers to the named entity, wherein the event is linked to the node representing the named entity in the directed graph.

13. The system of claim 9, wherein the operations performed by the processor (206) further comprises performing quantity recognition on the annotated document to annotate mentions of quantities.

14. The system of claim 9, wherein the operations performed by the processor (206) further comprises assigning a polarity to a nested event contained within an event, wherein the event has a first polarity and the nested event has a second nominal polarity, wherein the nested event is assigned a combined polarity, wherein a positive and a negative polarity combine to form a negative polarity, wherein a negative and a negative polarity combine to form a positive polarity, wherein a positive and a positive polarity combine to form a positive polarity, wherein the combined polarity is assigned to the nested event via annotation.

15. The system of claim 9, wherein the operations performed by the processor (206) further comprises assigning a utility to the event, wherein the utility is a function of the number of mentions of the event, the polarities of the mentions, and the speculation annotations of the mentions.

16. The system of claim 9, wherein the syntactic pattern comprise a declarative syntactic pattern, a passive syntactic pattern, a prepositional nominalization, a subject relative clause with optional apposition, a subject apposition syntactic pattern, or an object apposition paraphrastic causative individually or in combination.

17. The system (200) of claim 9, wherein the web-based user interface (202) further comprises a third input field accepting a user-defined grammar, wherein processing of the selected literature is based on the user-defined grammar.

18. The system (200) of claim 9, wherein the web-based user interface further comprises a graph search interface comprising:
a) at least one search box used to specify at least one of a cause and an effect, wherein the cause or effect is a term or function that operates as a starting node for a search;
b) a second search box specifying a maximum number of links between nodes in the graph that the search may traverse, wherein the search results return all terms and functions corresponding to nodes in the graph within the specified number of links, along with the links connecting them to the starting node;
c) a third search box used to further filter query results, wherein the filter searches for a text string or strings within the search results, wherein nodes not containing the text string and the links connecting to them are omitted from the results displayed;
d) a graph visualization displaying a network representation of the query results, wherein nodes indicating terms are displayed as separated shapes on the visualization, wherein lines indicating functions linking the nodes are displayed, wherein links with a positive utility are shown in a first color and links with a negative utility are shown in a second color colors, wherein the width of a link is proportional to the utility of the link between the two nodes; and
e) a table displaying the results as numbers in which each row corresponds to a line in the display and represents a link between the nodes in the graph, wherein each number corresponds to the utility of the connection.

19. The system of claim 9, wherein the web-based interface further comprises a model construction tool, wherein a model comprises the directed graph, wherein the directed graph comprises nodes and edges, wherein the nodes and edges have a plurality of attributes, wherein the model construction tool allows the user to edit the directed graph, wherein the model construction tool comprises:
a) a first tool function for adding a node comprising a term;
b) a second tool function for adding an edge comprising a function;
c) a graph visualization display, capable of displaying the nodes and edges of the directed graph, wherein the nodes are displayed as shapes, wherein the edges are displayed as lines connecting the nodes;
d) a third tool function for importing search results from the graph search interface into the model construction tool, wherein the nodes displayed in the search results are added to the directed graph, wherein the links displayed in the search results are added as edges in the directed graph, wherein the attributes of the nodes and edges in the search results are copied to the attributes of the nodes and edges in the directed graph;
e) a fourth tool function for merging imported search results with existing nodes and edges of the directed graph;
f) a fifth tool function for deleting nodes from the directed graph;
g) a sixth tool function for deleting edges from the directed graph;
h) a seventh tool function for editing attributes of the nodes and edges of the directed graph; and
i) an eighth tool function for saving the model for later rework.

* * * * *